(12) United States Patent
Souder et al.

(10) Patent No.: US 8,627,598 B1
(45) Date of Patent: Jan. 14, 2014

(54) SPROUTED SEED GRAIN GROWING AND HARVESTING APPARATUS AND METHOD

(71) Applicants: Dennis Souder, Millersburg, PA (US); Ivan W. Martin, Millersburg, PA (US)

(72) Inventors: Dennis Souder, Millersburg, PA (US); Ivan W. Martin, Millersburg, PA (US)

(73) Assignee: Sprouting Works, LLC, Millersburg, PA (US)

(*) Notice: Subject to any disclaimer, the term of this patent is extended or adjusted under 35 U.S.C. 154(b) by 0 days.

(21) Appl. No.: 13/838,850

(22) Filed: Mar. 15, 2013

(51) Int. Cl.
*A01G 31/02* (2006.01)

(52) U.S. Cl.
USPC ............... 47/65; 47/60; 47/1.01 R; 47/61

(58) Field of Classification Search
USPC .................. 47/60–61, 1.01 R, 1.01 P, 65
See application file for complete search history.

(56) References Cited

U.S. PATENT DOCUMENTS

| | | | | |
|---|---|---|---|---|
| 2,928,211 A * | 3/1960 | Martin | | 47/60 |
| 3,425,158 A * | 2/1969 | Kyle | | 47/65 |
| 3,432,965 A * | 3/1969 | Smith et al. | | 47/60 |
| 3,458,951 A * | 8/1969 | Martin | | 47/60 |
| 3,991,514 A * | 11/1976 | Finck | | 47/61 |
| 4,068,405 A * | 1/1978 | Campbell et al. | | 47/65 |
| 4,930,253 A * | 6/1990 | Todd, Sr. | | 47/65 |
| 5,493,808 A * | 2/1996 | Munday | | 47/60 |
| 6,055,771 A * | 5/2000 | Warnacut | | 47/58.1 R |
| 6,279,263 B1 * | 8/2001 | Lai | | 47/65 |
| 8,234,812 B1 * | 8/2012 | Colless et al. | | 47/61 |
| 2009/0235583 A1 * | 9/2009 | Colless et al. | | 47/61 |

OTHER PUBLICATIONS

Dynamic Fodder, http://www.dynamicfodder.com/photo-gallery/, Feb. 18, 2013.
Crop King, http://www.cropking.com/sites/CropKing.com/files/images/ForageSeedsinChannel.jpg, Feb. 18, 2013.
Crop King 6, http://www.cropking.com/sites/CropKing.com/files/images/foragerack.jpg, Feb. 18, 2013.
Fodder Solutions, http://www/foddersolutionsofazandnm.blogspot.com, Feb. 18, 2013.

* cited by examiner

*Primary Examiner* — Monica Williams
*Assistant Examiner* — Marc Burgess
(74) *Attorney, Agent, or Firm* — McNees Wallace & Nurick LLP

(57) ABSTRACT

An apparatus for growing and harvesting a tangled mass composed of sprouted seed grain includes a plurality of overlying immobile, substantially planar surfaces having a length. Each surface is configured to receive a layer of seed grain that is permitted to grow for a predetermined period of time on each surface, the layer of seed grain becoming a continuous tangled mass of sprouted seed grain. An extraction device removes the mass from each surface. A cleaning device removes debris from each surface prior to each surface receiving a subsequent layer of seed grain.

20 Claims, 16 Drawing Sheets

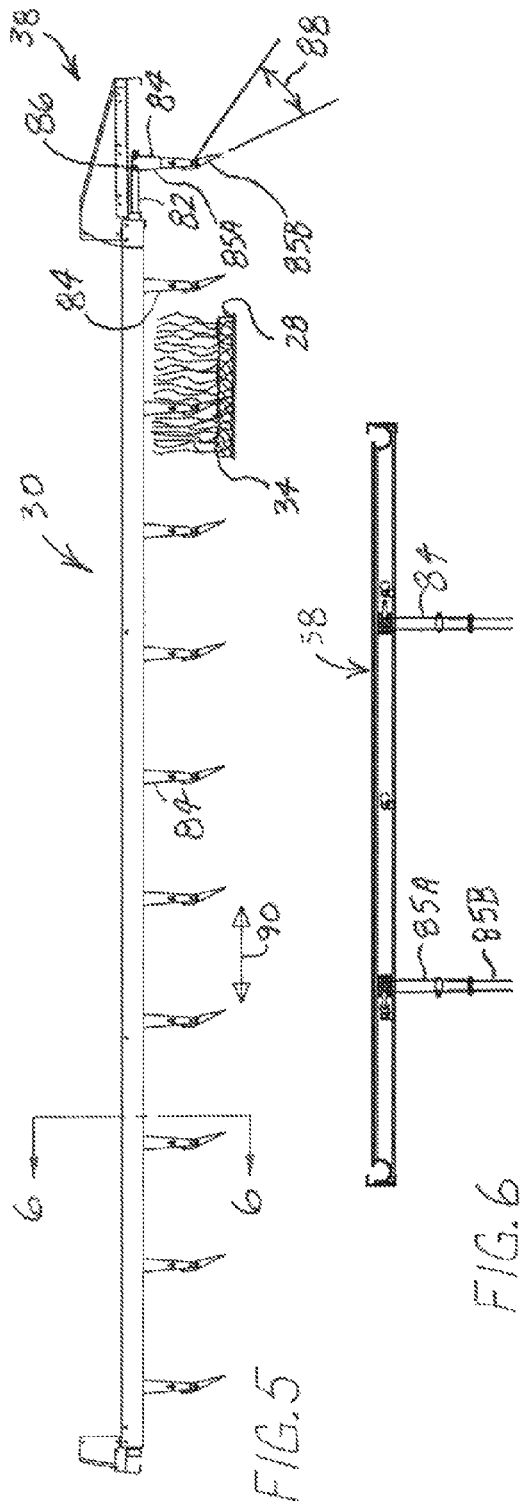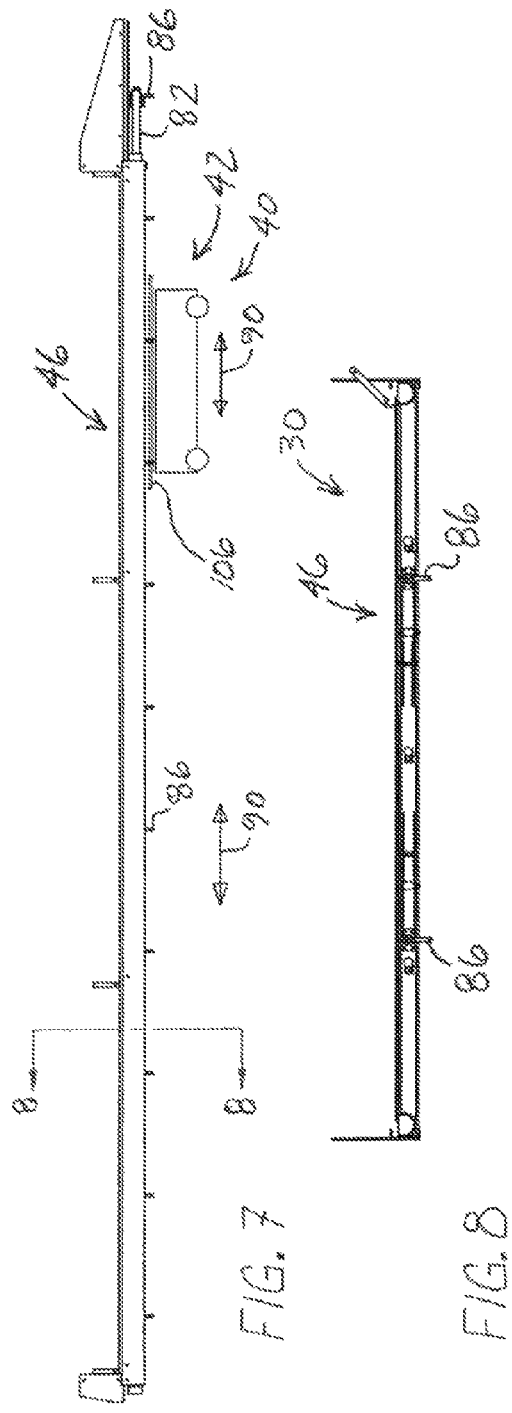

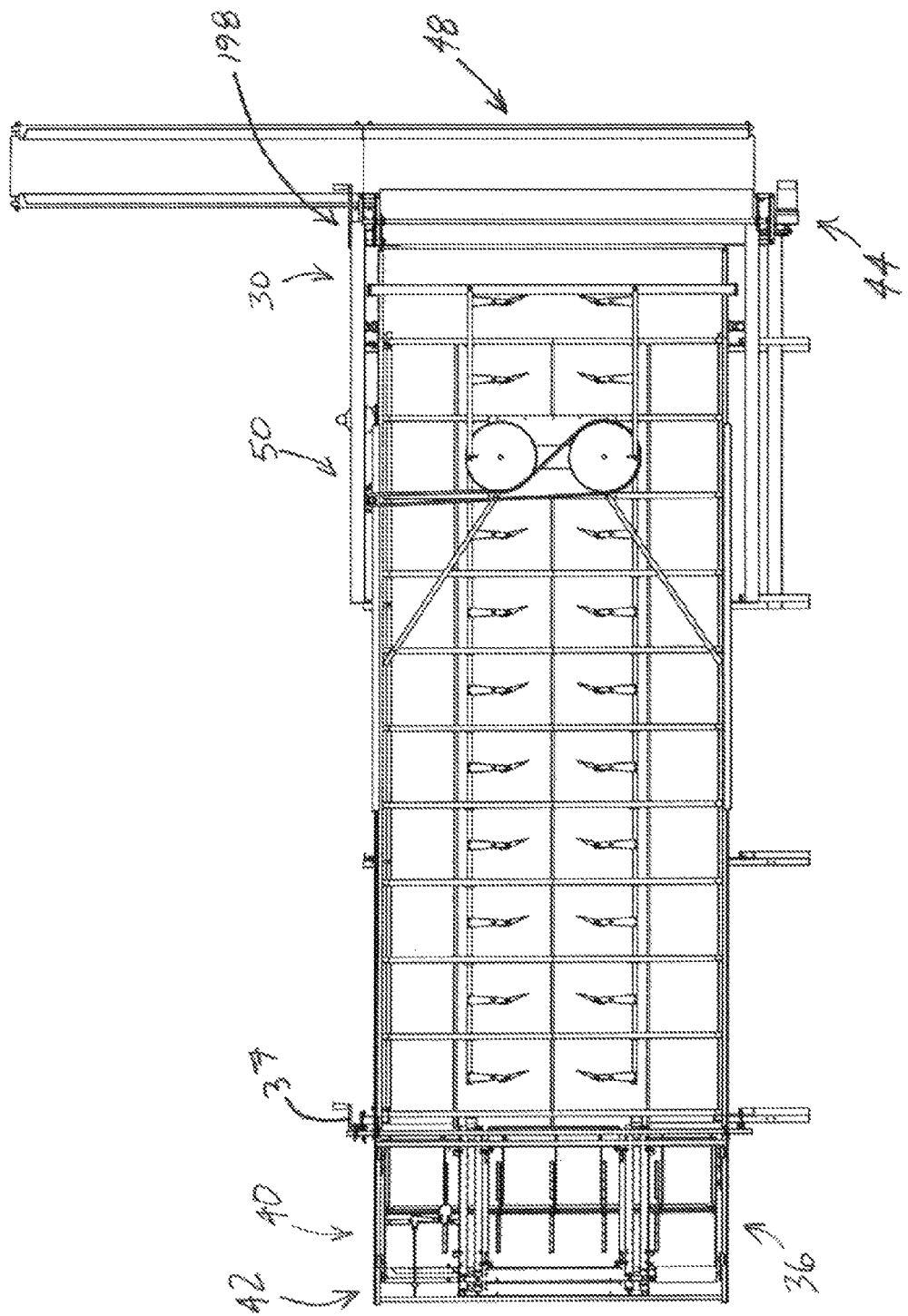

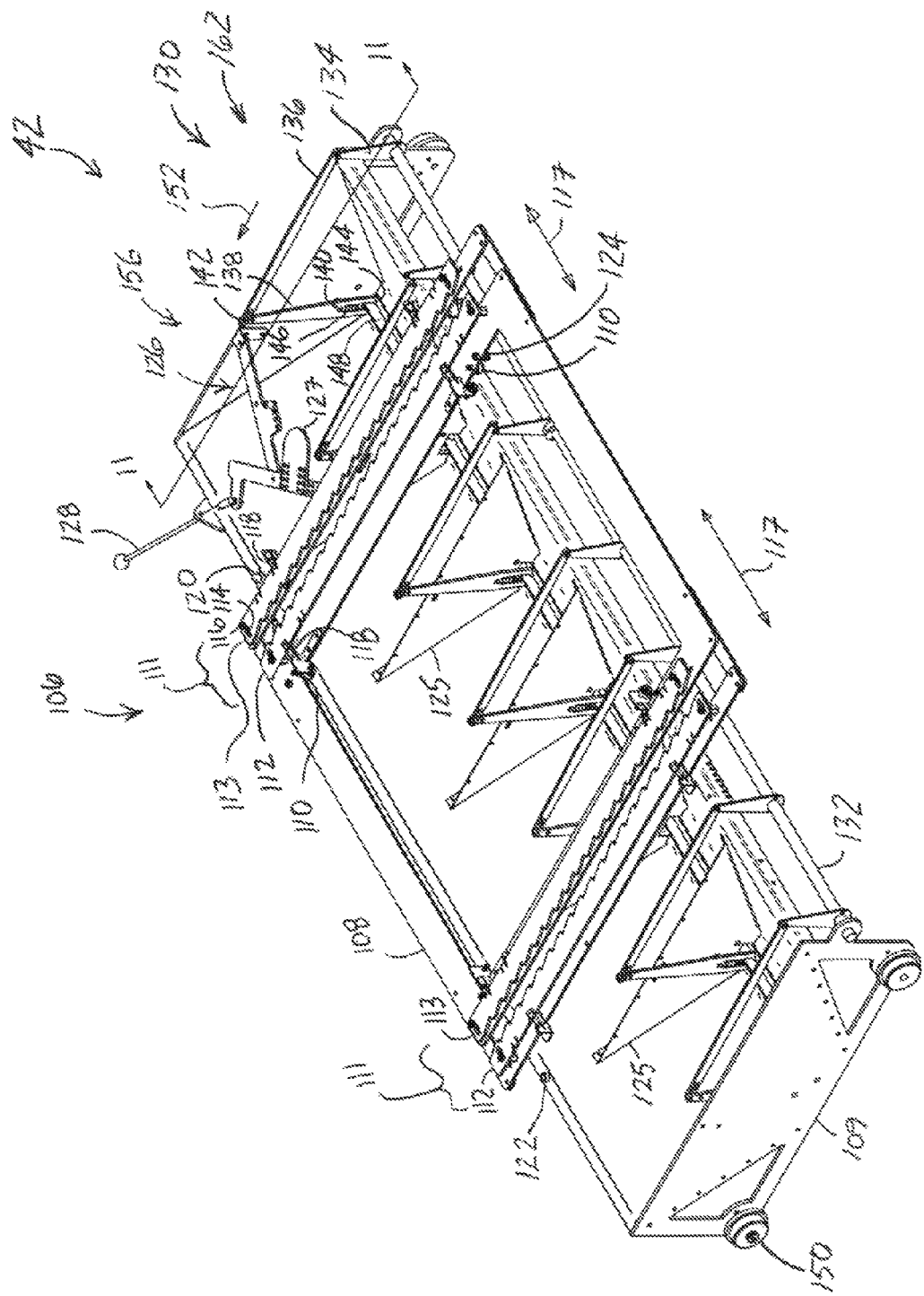

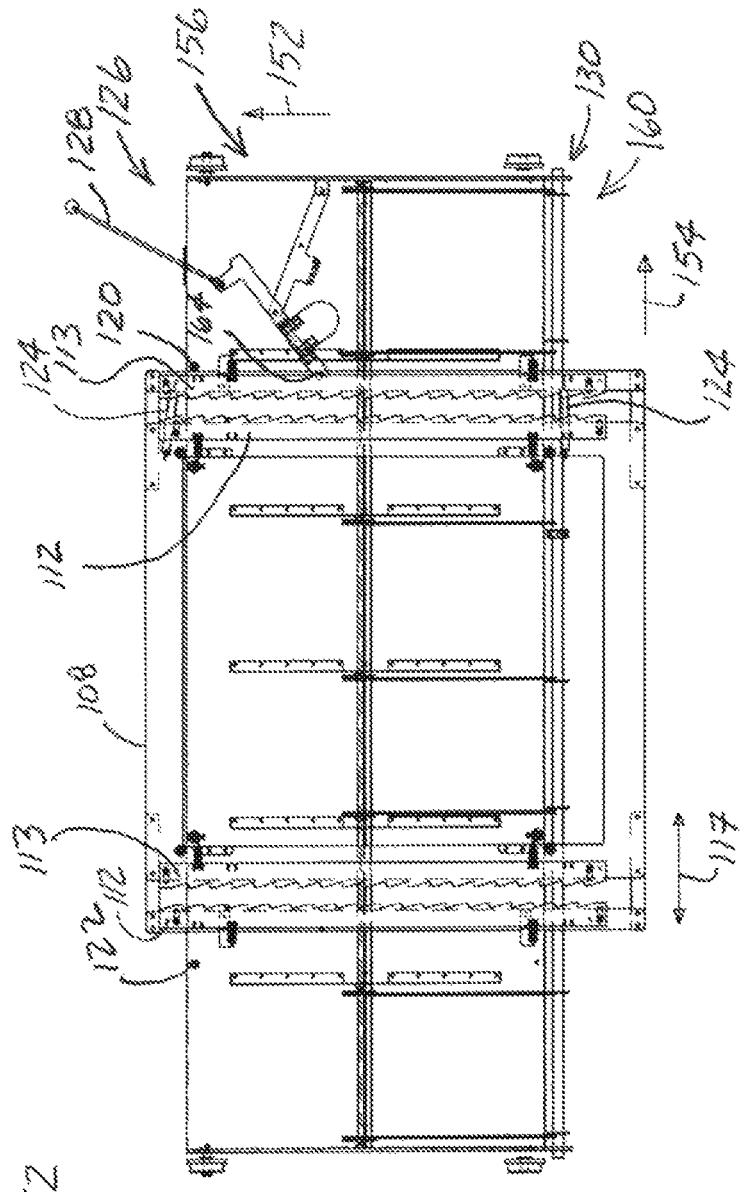
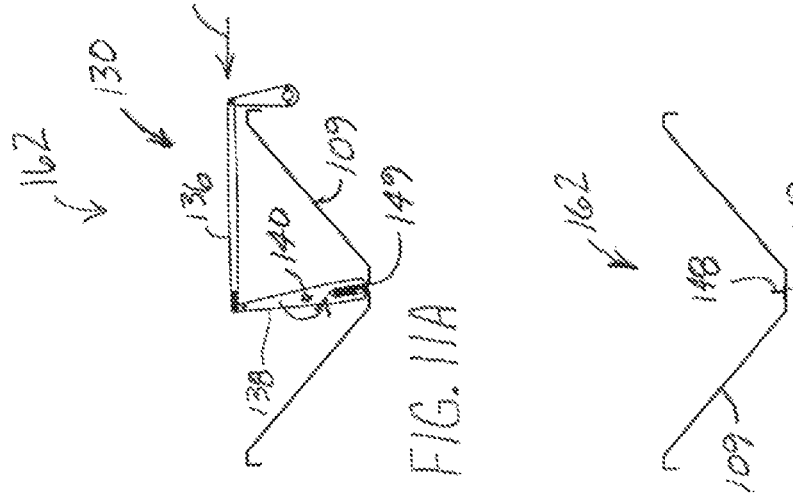
FIG. 14
FIG. 11A
FIG. 11B

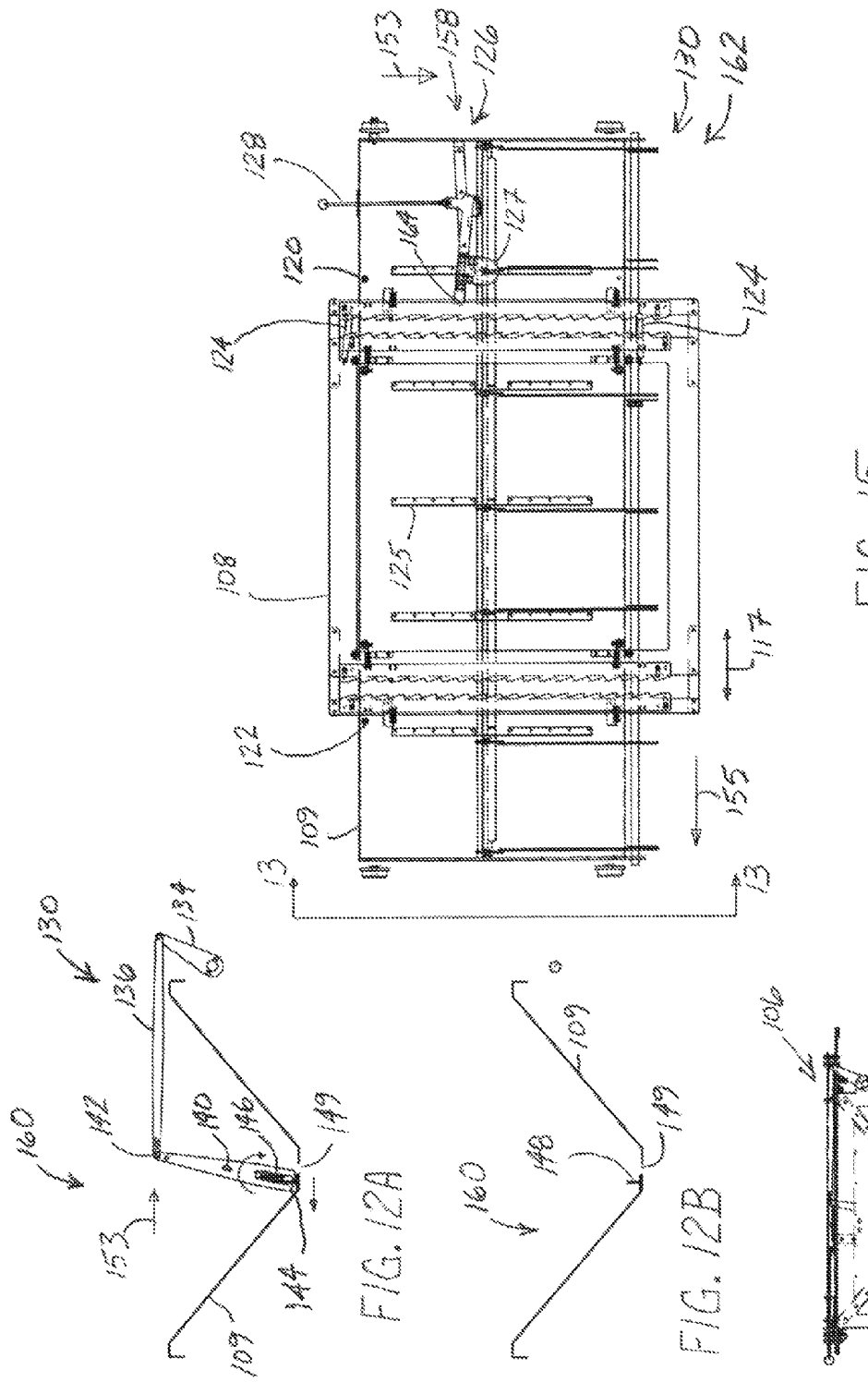

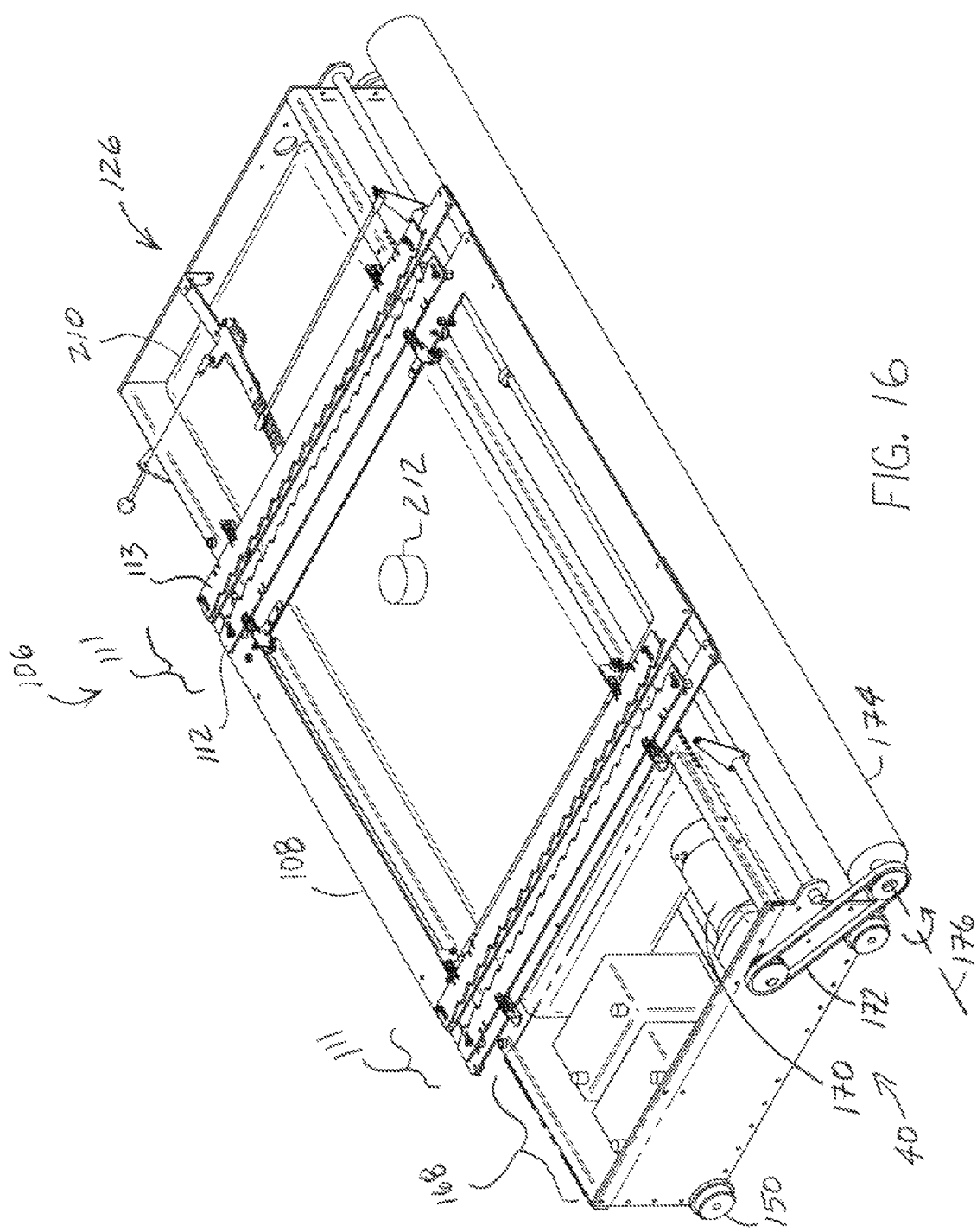

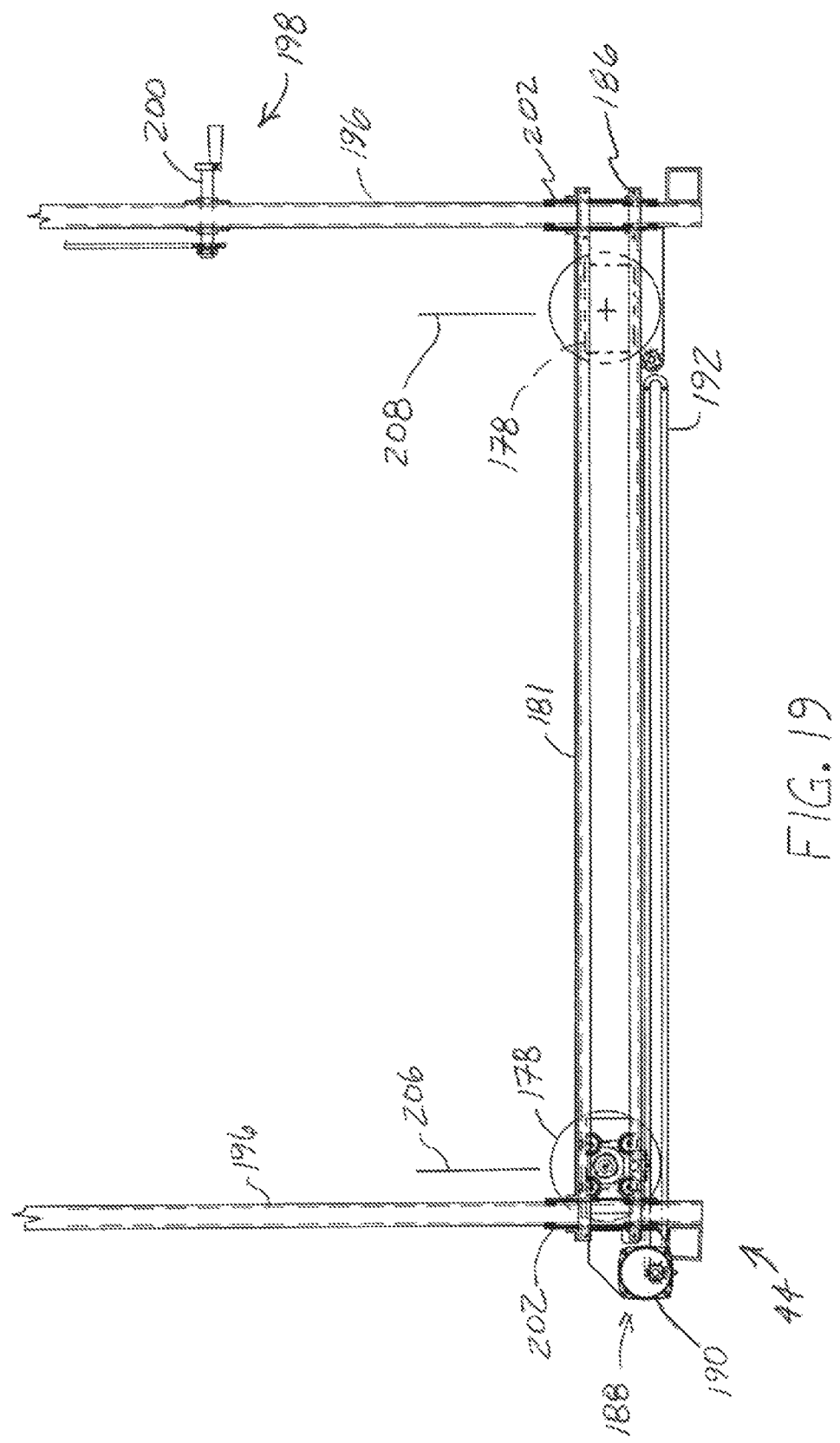

SPROUTED SEED GRAIN GROWING AND HARVESTING APPARATUS AND METHOD

FIELD OF THE DISCLOSURE

The present disclosure generally relates to crop growing systems. The present disclosure additionally relates to a sprouted seed grain growing system.

BACKGROUND OF THE DISCLOSURE

Producers of livestock are continually looking for ways to increase yield (e.g., milk, eggs) and/or quality of meat for consumption. Even for animals grazing on pastures, it has been determined that plants, such as grasses, provide decreased nutritional value as the plant grows. In response, a number of livestock producers have begun feeding their animals newly sprouted seed grain to bolster the level of nutrition contained in the diets of their animals. One recommended feeding regiment includes providing newly sprouted seed grain at a daily feed rate of two percent of an animal's live weight per day to achieve beneficial results.

Systems are available to produce the newly sprouted seed grain, utilizing small trays for the growing surface on which a layer of seed grain sprouts for harvesting, typically in one week or less. The trays are small, typically limited to a "footprint" of several square feet in area, due to the weight of sprouted seed grain that is harvested, which contains a high level of moisture, and which forms a tangled mass of interconnected roots that is difficult to separate into smaller pieces. Manually maintained systems require a significant amount of physical labor, including spreading seed grain in trays, placing the trays in a multi-layered rack, advancing (pushing) the trays along the rack, emptying the trays (harvesting the sprouted seed grain) and then washing the trays before repeating this continuous process. While this arrangement may be manageable for producers having a small number of livestock to maintain, a significant amount of producers have a sufficient number of livestock for which a daily production of 1,000 to 2,000 pounds or more of sprouted seed grain is required. On a daily basis, lifting, moving and distributing 2,000 pounds of dense masses of wet sprouted seed grain manually is not practical.

While automated systems are available, utilizing similarly sized trays for harvesting the sprouted seed grain as utilized with manual systems, such automated systems are extremely expensive and thus, are not available to most livestock producers.

Accordingly, there is a need for a cost effective, compact system that can significantly increase the rate of production of sprouted seed grain while significantly reducing most of the more physically demanding tasks associated with such production.

SUMMARY OF THE DISCLOSURE

An exemplary embodiment of the present disclosure is directed to an apparatus for growing and harvesting a tangled mass composed of sprouted seed grain, including a plurality of overlying immobile, substantially planar surfaces having a length. Each surface is configured to receive a layer of seed grain that is permitted to grow for a predetermined period of time on each surface. The layer of seed grain becomes a continuous tangled mass of sprouted seed grain. An extraction device is configured to remove the mass from each surface, and a cleaning device is configured to remove debris from each surface prior to each surface receiving a subsequent layer of seed grain.

A further embodiment of the present disclosure is directed to an apparatus for growing and harvesting a mass composed of sprouted seed grain, including a plurality of overlying immobile, substantially planar surfaces having a length. Each surface is configured to receive a layer of seed grain that is permitted to grow for a predetermined period of time on each surface. The layer of seed grain becomes a continuous tangled mass of sprouted seed grain. A seed deposition device is configured to deposit the layer of seed grain onto each surface. An extraction device is configured to remove the mass from each surface. A cleaning device is configured to remove debris from each surface prior to each surface receiving a subsequent layer of seed grain. An oscillating subframe selectively moves each of the seed deposition device, the extraction device, and the cleaning device over each surface of the plurality of surfaces between a stored first position and an extended second position.

A yet further embodiment of the present disclosure is directed to a method for growing and harvesting a mass composed of sprouted seed grain, and includes providing a plurality of overlying immobile, substantially planar surfaces having a length. Each surface is configured to receive a layer of seed grain that is permitted to grow for a predetermined period of time on each surface. The layer of seed grain becoming a continuous tangled mass of sprouted seed grain. The method further includes providing a seed deposition device for depositing the layer of seed grain onto each surface. The method further includes providing an extraction device for removing the mass from each surface. The method further includes providing a cleaning device for removing debris from each surface prior to each surface receiving a subsequent layer of seed grain. The method further includes providing an oscillating subframe for selectively moving each of the seed deposition device, the extraction device, and the cleaning device over each surface of the plurality of surfaces between a stored first position and an extended second position. The method further includes actuating the oscillating subframe, and aligning the seed deposition device with a corresponding surface devoid of a seed grain layer. The method further includes engaging the seed deposition device with the oscillating subframe, and engaging the extraction device with a corresponding surface containing a continuous mass of sprouted seed grain for removing the mass from the surface. The method further includes aligning the cleaning device with a corresponding surface subsequent to removal of the mass by the extraction device. The method further includes engaging the cleaning device with the oscillating subframe.

Further aspects of the method and system are disclosed herein. The features as discussed above, as well as other features and advantages of the present disclosure will be appreciated and understood by those skilled in the art from the following detailed description and drawings.

BRIEF DESCRIPTION OF THE DRAWINGS

FIG. 5 illustrates a partial side view of the oscillating subframe of FIG. 3 in a first operating mode, according to an embodiment of the disclosure.

FIG. 6 illustrates a view taken along line 6-6 of FIG. 5, according to an embodiment of the disclosure.

FIG. 7 illustrates a partial side view of the oscillating subframe of FIG. 3 in a second operating mode, according to an embodiment of the disclosure.

FIG. 8 illustrates a view taken along line 8-8 of FIG. 7, according to an embodiment of the disclosure.

FIG. 9 illustrates a plan view of an apparatus of FIG. 1, according to an embodiment of the disclosure.

FIG. 10A illustrates an upper perspective view of a seed deposition device in a closed position according to an embodiment of the disclosure.

FIGS. 11A and 11B illustrate partial cutaway views taken along line 11-11 of FIG. 10A, according to an embodiment of the disclosure.

FIGS. 12A and 12B illustrate partial cutaway views taken along line 12-12 of FIG. 10B, according to an embodiment of the disclosure.

FIG. 13 illustrates a side view taken along line 13-13 of FIG. 15, according to an embodiment of the disclosure.

FIG. 14 illustrates a plan view of the seed deposition device of FIG. 10A configured to travel in one direction, according to an embodiment of the disclosure.

FIG. 15 illustrates a plan view of the seed deposition device of FIG. 10B, configured to travel in a direction opposite that of FIG. 14, according to an embodiment of the disclosure.

FIG. 16 illustrates an upper perspective view of a cleaning device according to an embodiment of the disclosure.

FIG. 18 illustrates a reverse partial upper perspective view of the cutter of FIG. 17, according to an embodiment of the disclosure.

FIG. 19 illustrates a view of a cutter taken along line 19-19 of FIG. 2, according to an embodiment of the disclosure.

DETAILED DESCRIPTION OF THE DISCLOSURE

Specific embodiments of apparatus and methods for growing and harvesting a tangled mass composed of sprouted seed grain according to the disclosure are described below with reference to the drawings.

Figure 1:
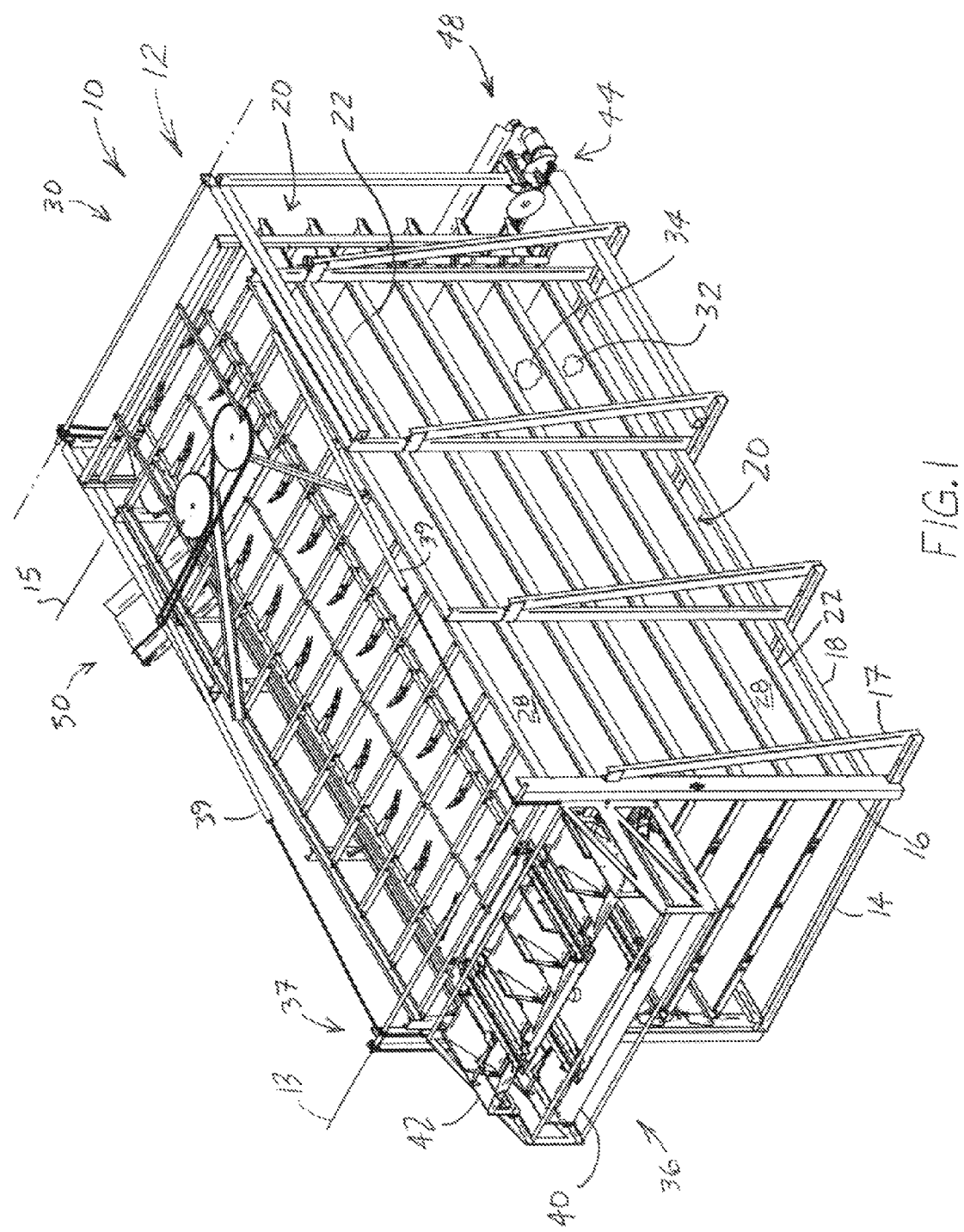
FIG. 1 illustrates an upper perspective view of an apparatus according to an embodiment of the disclosure.

FIG. 1 shows an apparatus 10 for growing and harvesting a tangled mass composed of sprouted seed grain. Apparatus 10 includes a frame 12 having opposed ends 13, 15. Frame 12 includes longitudinal base members 18 secured to vertical members 16 buttressed by brace members 17, with transverse base members 14 extending between corresponding vertical members 16. As further shown collectively in FIGS. 1-4, frame 12 includes corresponding pairs of longitudinal support members 22 interconnected by a plurality of transverse support members 24 positioned therebetween, forming a surface support 20. As further collectively shown in FIGS. 1, 2 and 4, upper surfaces 26 of transverse support members 24 of surface support 20 structurally support a sheet having a substantially planar surface 28 for receiving a layer 32 of seed grain (FIG. 1). After a predetermined period of time has passed, such as between about 3 days and about 8 days, depending upon the type of seed grain utilized, such as barley seed or any suitable seed grain, layer 32 of seed grain becomes a tangled mass 34 composed of sprouted seed grain.

Figure 2:
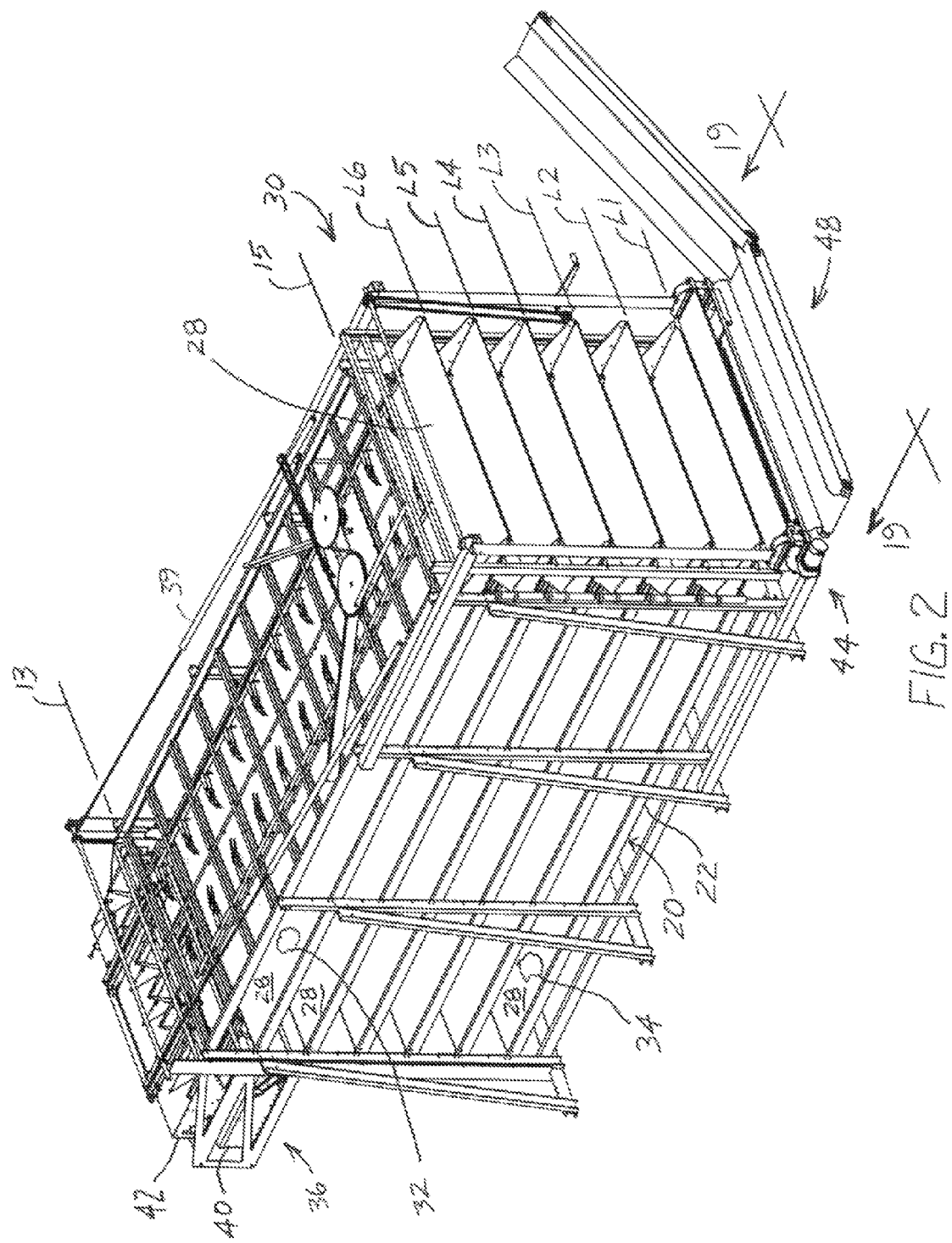
FIG. 2 illustrates a reverse upper perspective view of the apparatus of FIG. 1, according to an embodiment of the disclosure.

As shown in FIG. 2, the apparatus includes six surface supports 20 each supporting a corresponding sheet having a surface 28 representing six seed grain growing levels L1, L2, L3, L4, L5, L6. In another embodiment, a different number of growing levels other than six growing levels may be utilized in the apparatus. As further shown in FIGS. 1 and 3, apparatus 10 includes an oscillating subframe 30. As further shown in FIGS. 1-3, apparatus 10 includes an elevation control device 36 comprising a frame for supporting and selectively vertically aligning a cleaning device 40 and a seed deposition device 42 for accessing seed grain growing levels L1, L2, L3, L4, L5, L6. As further shown in FIGS. 1 and 9, elevation control device 36 includes a crank-operated mechanism 37 utilizing a biasing device 39, such as a spring configured to apply a tensile retention force to reduce the downward force due to gravity of elevation control device 36, including cleaning device 40 and a seed deposition device 42, and also resulting in a reduction in the forces required to vertically manipulate the elevation control device 36 such as by crank-operated mechanism 37. Oscillating subframe 30 includes an extraction device 38 that can also be used as a propulsion device 46. That is, propulsion device 46 can be used to drivingly move seed deposition device 42 and cleaning device 40 between a stored first position in close proximity to end 13 of frame 12 of apparatus 10 and an extended second position in close proximity to end 15 of frame 12 over corresponding surfaces 28 associated with each of the seed grain growing levels L1, L2, L3, L4, L5, L6, as will be discussed in further detail below. As further shown in FIGS. 1-2, an optional cutter 44 that is positioned in close proximity to end 15 of frame 12 of apparatus 10 is selectively movable between seed grain growing levels L1, L2, L3, L4, L5, L6, as will also be discussed in further detail below. A conveyor 48 can be used collect sliced portions that are incrementally removed from the mass 34 of sprouted seed grain.

For purposes of the disclosure, a tangled mass of sprouted seed grain, a mass of sprouted seed grain or the like is intended to include any combination of a tangled root mass of sprouted seed grain, sprouted seed grain, and unsprouted seed grain.

For purposes of the disclosure, terms such as oscillating and reciprocating and the like can be used interchangeably.

For purposes of the disclosure, a continuous tangled mass of sprouted seed grain, a continuous mass of sprouted seed grain and the like is intended to include any combination of a tangled root mass of sprouted seed grain, sprouted seed grain, and unsprouted seed grain that is larger in surface area in comparison to the cross sectional area or "footprint" of conventional trays utilized in both manual and automated sprouted seed grain systems. For example, assuming each square foot (ft.$^2$) of continuous mass of sprouted seed grain weighs about 6 pounds, approximately 2½ square feet (ft.$^2$) of continuous mass of sprouted seed grain would weigh approximately 15 pounds, which has been identified as a target weight for harvesting. In contrast, a continuous mass of sprouted seed grain grown on a surface according to one embodiment of the disclosure is about 84 ft.$^2$. If the cross sectional area of a continuous mass of sprouted seed grain is substantially the same as the surface 28 (6'×14') in one embodiment of the disclosure, the continuous mass of sprouted seed grain would weigh about 500 pounds or more.

In one embodiment, the area of surface 28 is greater than 100 ft.$^2$, about 100 ft.$^2$, between about 95 ft.$^2$ and about 5 ft.$^2$, between about 95 ft.$^2$ and about 10 ft.$^2$, between about 95 ft.$^2$ and about 15 ft.$^2$, between about 95 ft.$^2$ and about 20 ft.$^2$, between about 95 ft.$^2$ and about 25 ft.$^2$, between about 95 ft.$^2$ and about 30 ft.$^2$, between about 95 ft.$^2$ and about 35 ft.$^2$, between about 95 ft.$^2$ and about 40 ft.$^2$, between about 95 ft.$^2$ and about 45 ft.$^2$, between about 95 ft.$^2$ and about 50 ft.$^2$, between about 95 ft.$^2$ and about 55 ft.$^2$, between about 95 ft.$^2$ and about 60 ft.$^2$, between about 95 ft.$^2$ and about 65 ft.$^2$, between about 95 ft.$^2$ and about 70 ft.$^2$, between about 95 ft.$^2$ and about 75 ft.$^2$, between about 95 ft.$^2$ and about 80 ft.$^2$, between about 95 ft.$^2$ and about 85 ft.$^2$, between about 95 ft.$^2$ and about 90 ft.$^2$, or any suitable sub-range of thereof.

It is to be understood that the area of surface 28 could greatly exceed 100 ft.$^2$, especially if modular frame portions can be assembled/disassembled to provide access for maintenance purposes, for example.

In one embodiment, surface 28 is configured to be substantially completely covered by layer 32 of seed grain. In other embodiments, a lesser portion of surface 28 can be covered by the layer 32 of seed grain, if desired.

In one embodiment, a sheet having surface 28 is composed of a sheet of suitable substantially planar material having sufficient structural strength and rigidity as well as resistance to break-down, such as corrosion by a conducive environment for sprouting seed grain (elevated humidity and substantially continuous exposure to water). For example, the sheet may be composed of a nonmetal sheet, such as a polymer sheet such as Plexiglas®, a registered trademark owned by Arkema France Corporation of Colombus, France. In one embodiment, surface 28 can comprise a plurality of sheets positioned such that the edges abut each other to form a continuous surface. In addition, polymer sheets may provide optical qualities such as transparency or some degree of translucence through the sheets between applications of seed grain, such as for maintenance purposes. In another embodiment, the sheet as well as structural members may be composed of other suitable materials, such as stainless steel, aluminum or other suitable materials or suitably coated materials permitting extended exposure to the wet environment.

Figure 3:
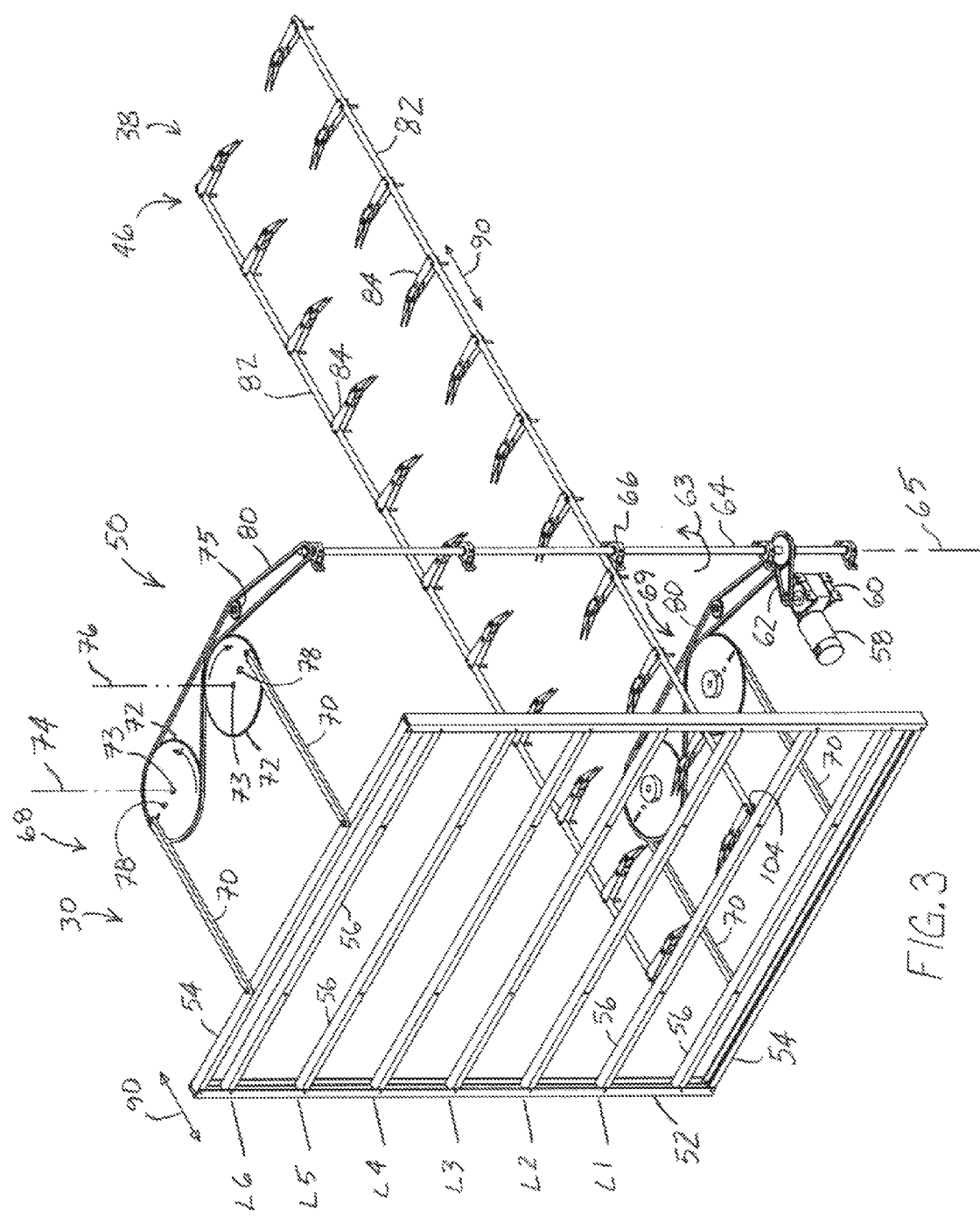
FIG. 3 illustrates a partial cutaway, upper perspective view of an oscillating subframe, according to an embodiment of the disclosure.

As collectively shown in FIGS. 1-3, oscillating subframe 30 comprises horizontal subframe members 54 positioned between vertical subframe members 52. As shown, a plurality of horizontal subframe members 56 are positioned between horizontal subframe members 54. Oscillating subframe 30 further comprises an oscillation device 50 having a first oscillation drive portion 68 positioned at the top of oscillating subframe 30 and a second oscillation drive portion 69 positioned at the bottom of oscillating subframe 30. Ends of each of a pair of rods 70 are pivotably connected to horizontal subframe members 54 and corresponding openings 78 formed in drive sprockets 72 of each of first and second oscillation drive portions 68, 69. First and second oscillation drive portions 68, 69 are rotatably secured through centered openings 73 formed in drive sprockets 72 to frame 12 (FIG. 1) to rotate about respective axes 74, 76. A drive chain 80 meshes with drive sprockets 72 and idler sprocket 75 of each of first and second oscillation drive portions 68, 69. As shown, a motor 58 operatively connected to a gearbox 60 engages a drive chain 62 that urges a torque shaft 64 secured by clamp bearings 66 to frame 12 (FIG. 1) into rotational movement 63 about an axis 65, which rotational movement of torque shaft 64 likewise urges drive sprockets 72 of first and second oscillation drive portions 68, 69 into respective rotational movement about their corresponding center axes 74, 76.

As further shown in FIG. 3, extraction device 38 includes a pair of elongated members 82 secured at one end to a corresponding horizontal subframe member 56 (only one extraction device 38 is shown in FIG. 3). Extraction device 38 further includes a plurality of substantially aligned fingers 84. As shown in FIG. 3, fingers 84 include a first finger portion 85A and a second finger portion 85B. As further shown in FIG. 3, the same pair of elongated members 82 also includes a pin 86 that extends through each first finger portion 85A of a plurality of aligned pivoting fingers 84 and elongated members 82, the pins 86 further extending outwardly from the elongated members 82. Pins 86 help prevent rotational movement of first finger portion 85A relative to corresponding elongated members 82. Second finger portion 85B is pivotably connected to first finger portion 85A, permitting rotational movement 88 (FIG. 5) of each second finger portion 85B relative to the corresponding first finger portion 85A of each pair of fingers 84. In one embodiment, finger 84 can be of unitary construction, i.e., one piece construction, that is pivotably connected to elongated member 82 by a corresponding pin 86. In one embodiment, fingers 84 may be positioned in a staggered arrangement, i.e., not in pairs.

For purposes of this disclosure, the term fingers and pivoting fingers may be used interchangeably, although only second finger portion 85B pivots relative to first finger portion 85A of an embodiment of finger 84. Also, for purposes of this disclosure, when the pivoting fingers or fingers 84 are being utilized, the above collection of components are referred to collectively as extraction device 38. However, when the outwardly extending portions of the pins 86 are being utilized, the above collection of components are referred to collectively as a propulsion device 46, as will be described in additional detail below.

In one embodiment, extraction device 38/propulsion device 46 can include a single elongated member 82. In one embodiment extraction device 38/propulsion device 46 can include more than two elongated members 82.

In operation, the pairs of rods 70 for each of respective first and second oscillation drive portions 68, 69 are positioned to provide synchronized driven oscillating longitudinal movement 90 generated by the first and second oscillation drive portions 68, 69. As further shown in FIG. 3, the distance between centered opening 73 of drive sprockets 72 and the particular radially disposed openings 78 of the drive sprockets 72 that are rotatably secured to the corresponding end of pivot rod 70 determines the magnitude of oscillation of oscillating subframe 30. That is, if the ends of pivot rod 70 are rotatably secured to openings 78 that are positioned 6 inches from centered openings 73 of the drive sprockets 72, the magnitude of oscillation of oscillating subframe 30 equals the radial distance multiplied by two, or an oscillation distance of 12 inches, also referred to as a stroke.

In one embodiment, a single oscillation drive portion, such as first oscillation drive portion 68 can be used. In another embodiment, more than two oscillation drive portions can be used. However, due to the arrangement of the embodiment shown in the present disclosure, in which axis 65 of torque shaft 64 is transversely outboard of oscillating subframe 30, first and second oscillation drive portions 68, 69 are each positioned either vertically above or below seed grain growing levels L1, L2, L3, L4, L5, L6. As a result, not only do the first and second oscillating portions 68, 69 provide a smooth, synchronized oscillating movement of oscillating subframe 30, but by virtue of not having an oscillation drive portion positioned between any of the seed grain growing levels L1, L2, L3, L4, L5, L6, the distance between adjacent seed grain growing levels can be minimized, resulting in a compact construction, while maximizing the amount of surface available to grow and harvest masses of sprouted seed grain.

Figure 4:
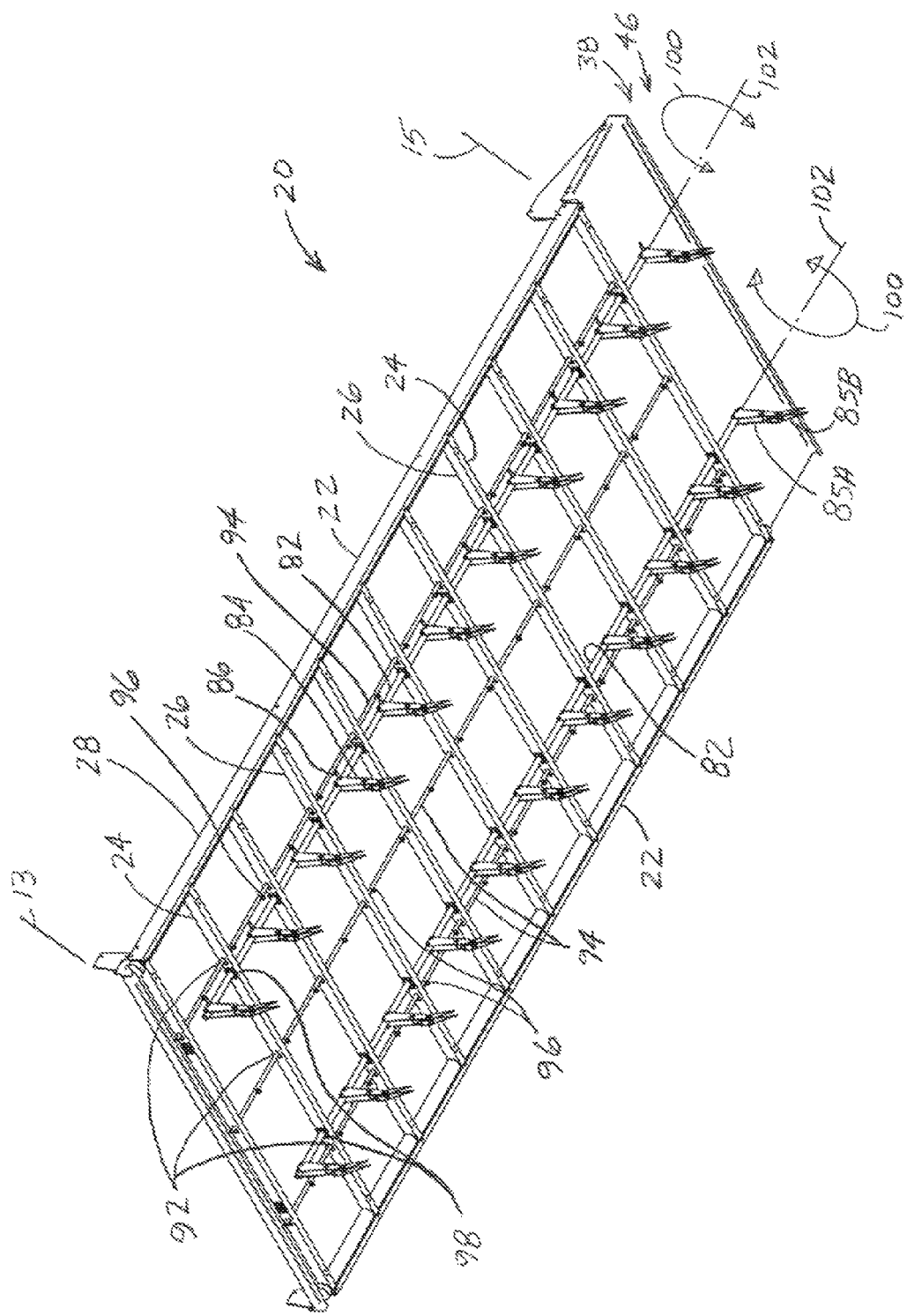
FIG. 4 illustrates a further partial cutaway, lower perspective view of a surface support of FIG. 1, according to an embodiment of the disclosure.

As collectively shown in FIGS. 1, 3 and 4, surface support 20 is comprised of corresponding pairs of longitudinal support members 22 interconnected by a plurality of transverse support members 24 positioned therebetween. A plurality of openings 92 are formed in transverse support members 24 to receive water lines 94 having nozzles 96 for directing water onto the layer 32 of seed grain (FIG. 1). In addition, as further shown in FIG. 4, openings 98 are formed in transverse support members 24 to receive elongated members 82 of extraction device 38/propulsion device 46. As a result of oscillating longitudinal movement 90 (FIG. 3), improved uniformity of water distribution occurs, despite non-movement of either water lines 94 and corresponding nozzles 96 relative to transverse support members 24. However, as a result of oscillating longitudinal movement 90 (FIG. 3) of elongated members 82 relative to transverse support members 24, extraction device 38 operates to remove a continuous mass 34 of seed grain (FIG. 1) from surface 28 of frame 12 (FIG. 1). In addition, as a result of oscillating longitudinal movement 90 (FIG. 3) of elongated members 82 relative to transverse support members 24, propulsion device 46 operates to provide directed longitudinal movement of each of speed deposition device 42 and cleaning device 40 (FIG. 1).

As shown collectively in FIGS. 2 and 4-6, but predominantly in FIG. 4, elongated members 82 of extraction device 38 include a plurality of downwardly directed pivoting fingers 84. An operator (not shown) applies a force resulting in a rotational movement 100 about an axis 102 of elongated member 82. Elongated member 82 has a locking feature 104 (FIG. 3) such as a detent between horizontal subframe member 56 and a corresponding elongated member 82. Locking feature 104 ensures the pivoting fingers 84 are maintained at a substantially perpendicular position relative to the immediately adjacent surface 28 (FIG. 1) positioned beneath the pivoting fingers 84 when the elongated member 82 is operating as an extraction device 38.

As further shown collectively in FIGS. 5-6, in response to oscillatory longitudinal movement 90 of extraction device 38 (toward the right; toward end 15 of frame 12 in FIG. 1), fingers 84 engage the mass 34 of sprouted seed grain supported by surface 28 and likewise urge the mass 34 of sprouted seed grain into longitudinal movement 90 (toward the right; toward end 15 of frame 12 in FIG. 1) relative to surface 28. However, during the portion of oscillatory longitudinal movement 90 of extraction device 38 in the opposite direction (toward the left; toward end 13 of frame 12 in FIG. 1), second finger portions 85B of fingers 84 are urged into rotational movement 88 about the pivotable connections of corresponding first finger portions 85A such that the ends of second finger portions 85B of fingers 84 angularly deflect and slide over the mass 34 of sprouted seed grain supported by surface 28. In response to resumption of oscillatory longitudinal movement 90 (toward the right; toward end 15 of frame 12 in FIG. 1) relative to surface 28, second finger portions 85B of fingers 84 pivot to a substantially vertical position and again engage and urge the mass 34 of sprouted seed grain into longitudinal movement 90 (toward end 15 of frame 12 in FIG. 1). The process is repeated until the mass 34 of sprouted seed grain is removed from surface 28.

As shown collectively in FIGS. 2 and 4-6, but predominantly in FIG. 4, elongated members 82 of propulsion device 46 include a plurality of pins 86 extending through the elongated members 82, with the pins 86 outwardly extending from the same side of the elongated members 82. As shown in FIG. 4, pins 86 are angularly offset substantially perpendicular to fingers 84. An operator (not shown) applies a force to propulsion device 46, resulting in a rotational movement 100 about an axis 102 of elongated member 82. Elongated member 82 has a locking feature 104 (FIG. 3) such as a detent between horizontal subframe member 56 and a corresponding elongated member 82. Locking feature 104 ensures the pins 86 are maintained at a substantially perpendicular position relative to the immediately adjacent surface 28 (FIG. 7) positioned beneath the pivoting pins 86 when the elongated member 82 is operating as a propulsion device 46.

As further shown collectively in FIGS. 7-8, in response to oscillatory longitudinal movement 90 of propulsion device 46 in either longitudinal direction along the surface 28 generally between opposed ends 13, 15 of frame 12 (FIG. 1), the cleaning device 40 and seed deposition device 42 each have engagement features 106 (only one of devices 40, 42 is configured for use on a seed growing layer at a particular time). The protruding elements or pins 86 are configured to confront engagement features 106 and likewise urge the cleaning device 40/seed deposition device 42 into selective longitudinal movement 90 relative to surface 28 generally between opposed ends 13, 15 of frame 12 (FIG. 1).

As collectively shown in FIGS. 10A, 10B, 11A, 11B, 12A, 12B and 13-15, seed deposition device 42 is now discussed. Seed deposition device 42 includes a container 109 for holding seed grain that is to be deposited onto surface 28 of the growing levels L1, L2, L3, L4, L5, L6 (FIG. 2). Seed deposition device 42 includes wheels 150 rotatably supporting container 109 of seed deposition device 42 that are urged into driven rotational movement over longitudinal support members 22 of frame 12 (FIG. 2) generally between a stored first position in elevation control device 36 (FIG. 2) in proximity to end 13 of frame 12 and an extended second position in proximity to end 15 of frame 12. Container 109 includes a plurality of dividers 125 that divide container 109 into smaller compartments for providing a more uniform application of seed grain onto surface 28.

Figure 10B:
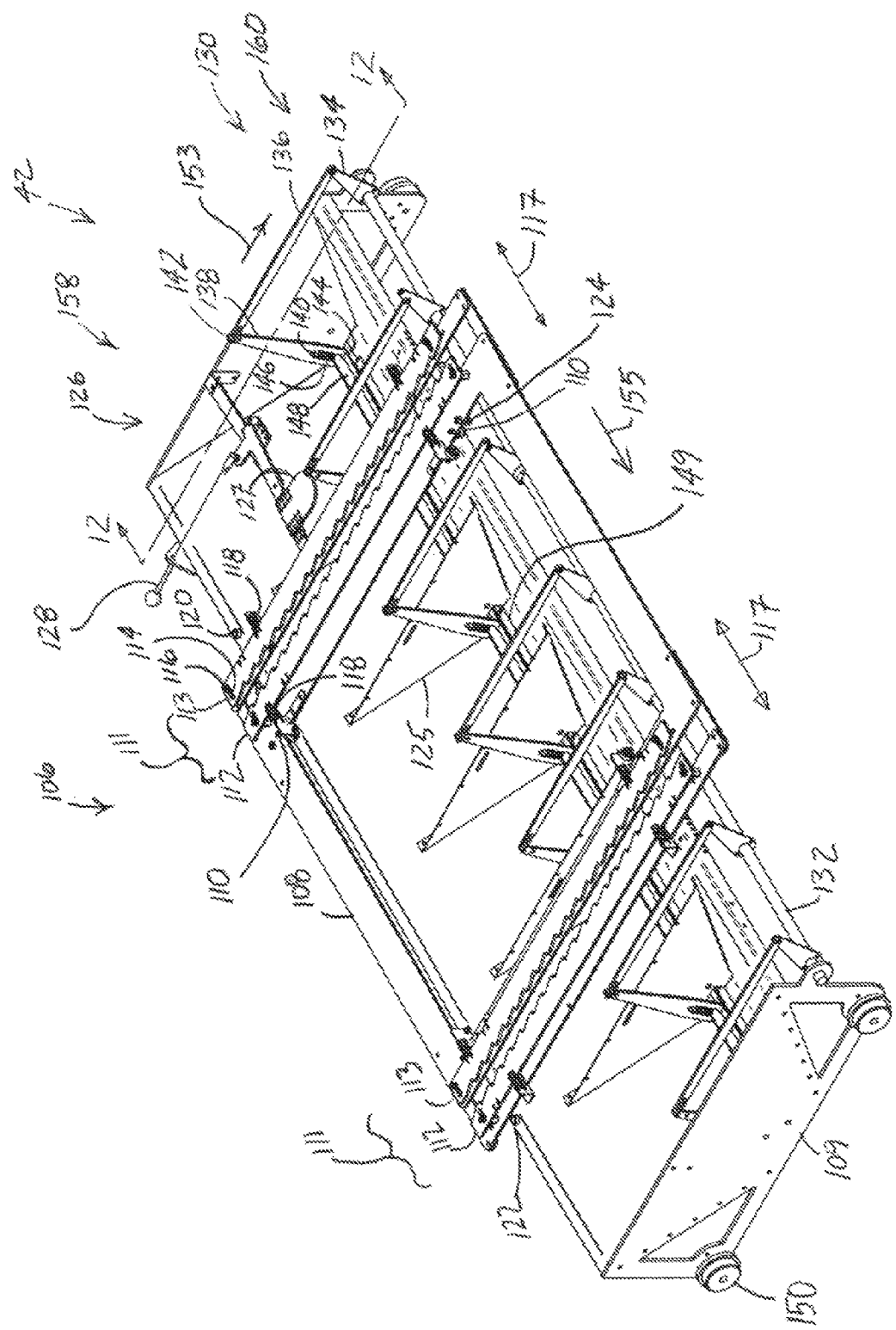
FIG. 10B illustrates an upper perspective view of a seed deposition device in an open position according to an embodiment of the disclosure.
Figure 17:
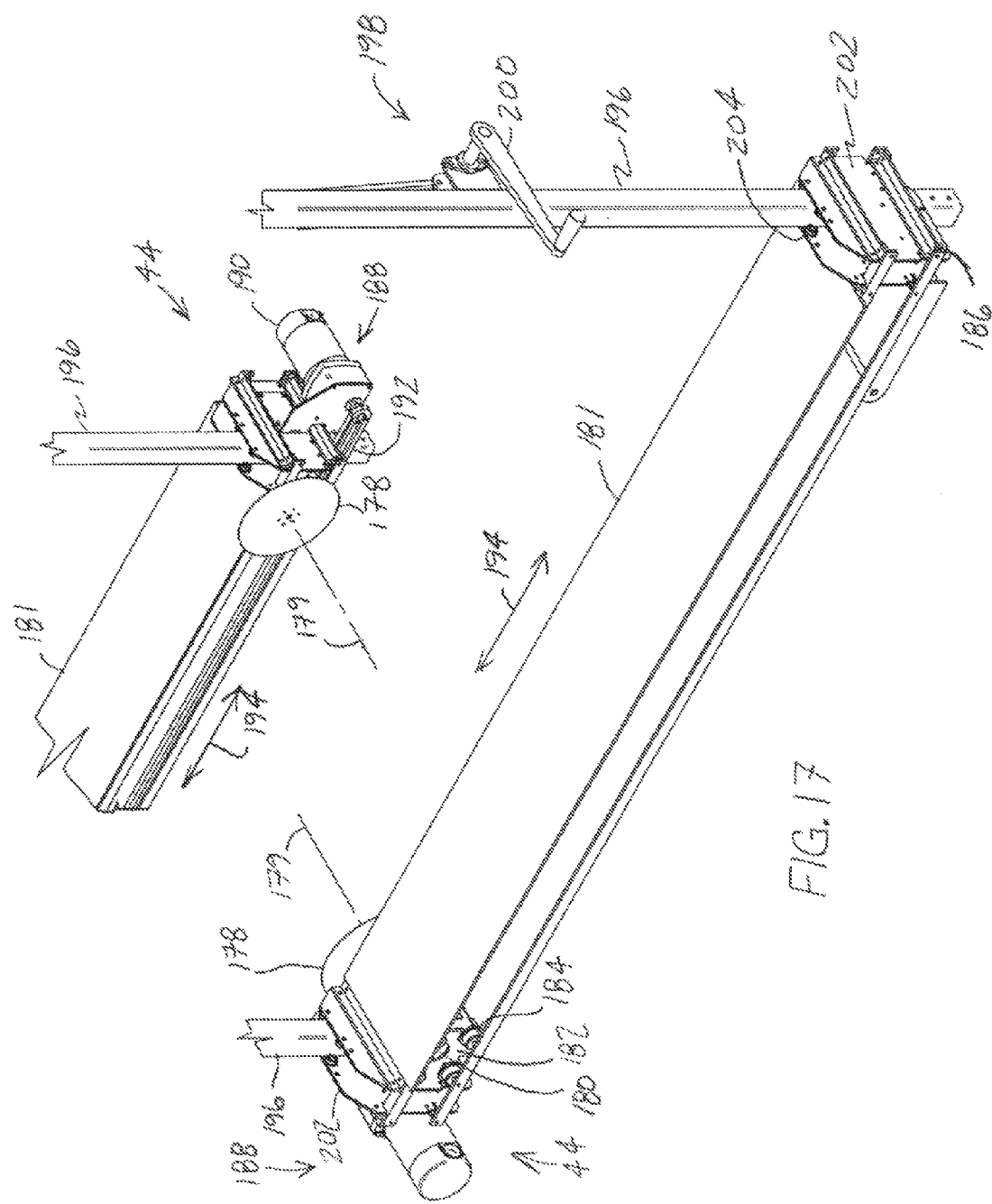
FIG. 17 illustrates a cutaway upper perspective view of a cutter according to an embodiment of the disclosure.

As shown in FIGS. 10A and 10B, corresponding to seed deposition device 42 arranged in closed position 162 and open or seed grain dispensing position 160, respectively, seed deposition device 42 includes a frame 108 having a plurality of guides 110 that engage portions of container 109, permitting guided movement of frame 108 relative to container 109 that is generally transverse to the direction of travel of container 109 over longitudinal support members 22 of frame 12 (FIG. 2). Frame 108 includes engagement features 106 comprising opposed pairs 111 of oppositely directed ratcheting teeth 112, 113 resiliently secured to frame 108. That is, slots 114 are formed adjacent to opposed ends of ratcheting teeth 112, 113, with a guide pin 116 extending through each slot 114 for slidably securing ratcheting teeth 112, 113 in opposed movement directions 117 relative to frame 108. Additionally, opposed pairs of biasing elements 118 are secured to frame 108 and located adjacent opposed ends of ratcheting teeth 112, 113 such that each pair of biasing elements 118 are configured to urge ratcheting teeth 112, 113 toward each other along movement direction 117 as permitted by slots 114. In this arrangement, such as collectively shown in FIGS. 20-21 (associated with seed deposition device 42 arranged in an open or seed grain dispensing position 160 as shown in FIG. 10B), ratcheting teeth 113 confront protruding elements such as pins 86 of oscillating propulsion device 46. In response to oscillating longitudinal movement 90 of elongated member 82 (FIG. 3), i.e., in a direction away from end 13 of frame 12 and toward end 15 of frame 12 (FIG. 1), also referred to as the gripping direction of ratcheting teeth 113, a corresponding tooth of ratcheting teeth 113 engages the corresponding pin 86 of oscillating propulsion device 46.

As a result of this engagement, seed deposition device 42 is urged into longitudinal movement away from end 13 of frame 12 toward end 15 of frame 12. At the end of the oscillating movement (stroke) of elongated member 82, the direction of oscillating movement of elongated member 82 and pins 86 are reversed. This change in direction results in pins 86 engaging ratcheting teeth 113 in the sliding direction of ratcheting teeth 113. That is, teeth of ratcheting teeth 113 are deflected transversely in direction 117 (FIG. 14), resulting in pin(s) 86 moving relative to ratcheting teeth 113. Upon the oscillating movement (stroke) again being reversed in direction, ratcheting teeth again engage pin(s) 86, urging seed deposition device 42 into longitudinal movement away from end 13 of frame 12 and toward end 15 of frame 12.

As further collectively shown in FIGS. 10A and 14, as well as in FIGS. 10B and 15, seed deposition device 42 includes a pair of biasing members 124, such as springs that continually urge frame 108 away from stop 122 and toward stop 120 of container 109. However, a direction control linkage 126, including a protruding member 127, determines the arrangement of pairs 111 of ratcheting teeth 112, 113 relative to container 109 and thus, the direction of longitudinal movement of seed deposition device 42 relative to frame 12. In addition, when direction control linkage 126 is urged to move from a first position 156 (knob-end shaft 128 is extended; FIGS. 10A and 14) to a second position 158 (knob-end shaft 128 is retracted; FIGS. 10B and 15), a seed grain deposition linkage 130 is similarly urged to move from a closed position 162 to a seed grain dispensing position 160.

As shown collectively in FIGS. 10A and 14, seed deposition device 42 is positioned in elevation control device 36 adjacent to end 13 of frame 12 and aligned to deposit seed grain onto surface 28 of seed grain growing level L6 that has been provided to container 109 from a seed grain source (not shown), such as a seed grain vessel that directly conveys seed grain into container 109. In one embodiment, seed grain is manually filled into container 109, or by other suitable arrangement. FIG. 10A shows seed deposition device 42 with direction control linkage 126 in first position 156 and seed grain deposition linkage 130 in closed position 162. In order to apply a layer of seed grain onto surface 28 of seed grain growing level L6 (or onto any other level), seed grain is to be loaded into container 109. Once container 109 is loaded with seed grain, and after seed deposition device 42 is manually pushed from elevation control device 36 until a slot 149 (FIG. 10B) of container and 109 is positioned on surface 28, seed grain deposition linkage 130 is actuated from closed position 162 (FIGS. 10A and 14) to open or seed grain dispensing position 160 (FIG. 10B).

Figure 20:
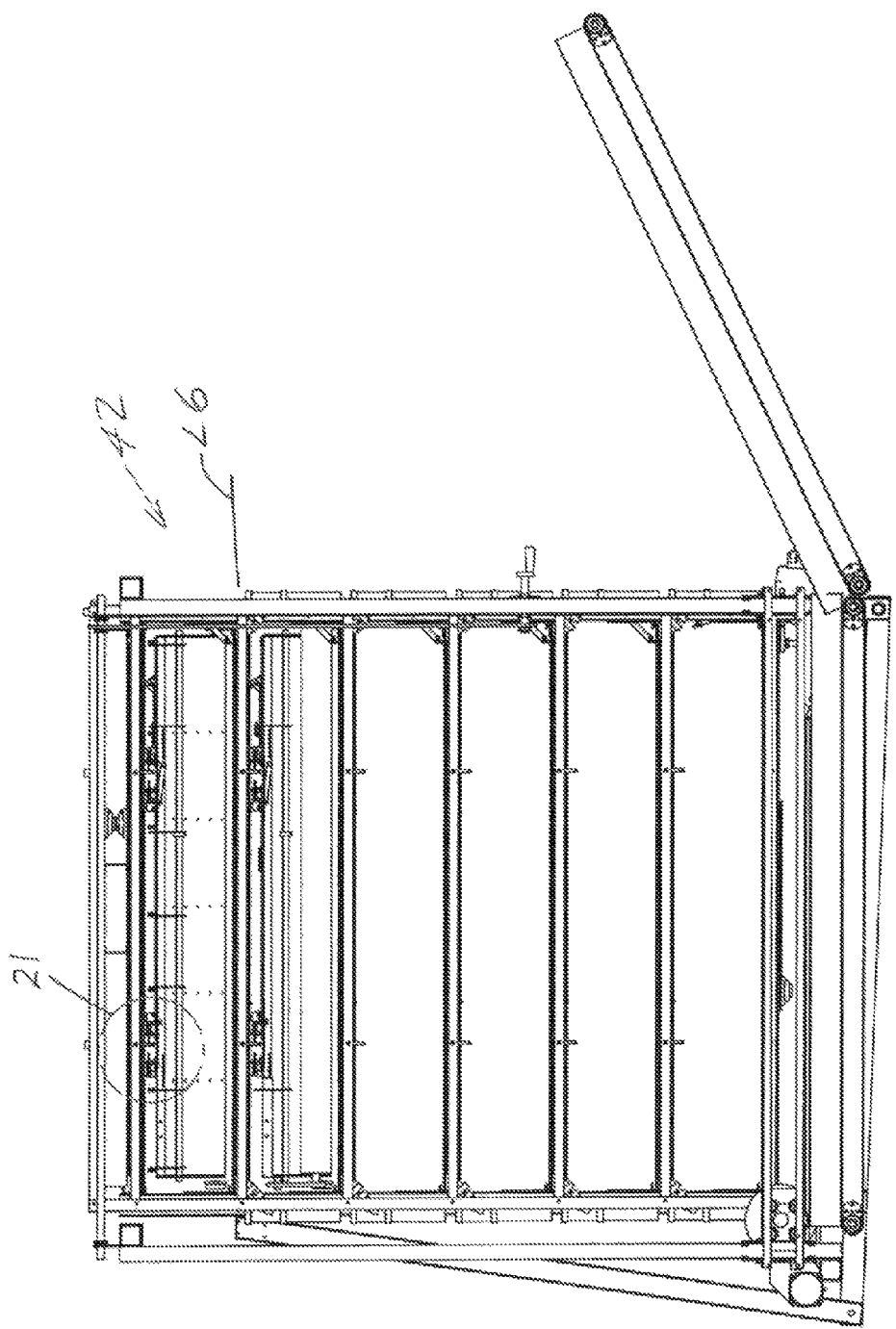
FIG. 20 illustrates an end view of the apparatus of FIG. 1, according to an embodiment of the disclosure.
Figure 21:
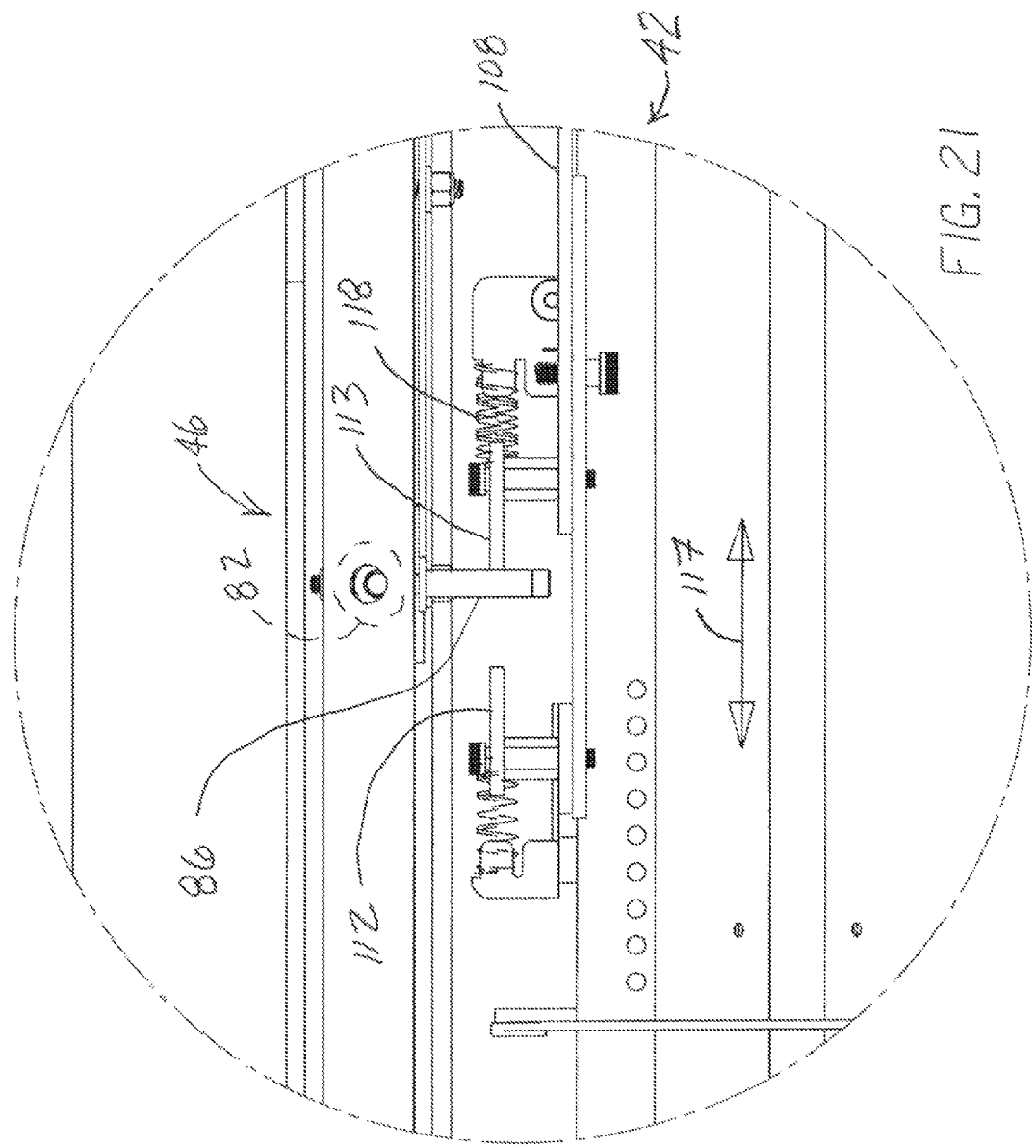
FIG. 21 illustrates an enlarged partial end view of a propulsion device drivingly moving a seed deposition device in one direction taken along region 21 of FIG. 20, according to an embodiment of the disclosure.

As further shown collectively in FIGS. 10A and 14, as well as in FIGS. 10B and 15, seed grain deposition linkage 130 includes a torque rod 132 having a plurality of cranks 134 that are pivotably connected to corresponding push rods 136 that engage ends 142 of corresponding levers 138. Each lever 138 has a pivot 140 positioned between opposed ends 142, 144. End 144 is configured to receive a biasing member 146 such as a spring and a flow control device 148 for controlling flow of seed grain through slot 149 of container 109. When seed grain deposition linkage 130 is arranged in closed position 162, flow control device 148 is positioned by end 144 of lever 138 over slot 149 of container 109, preventing the flow of seed grain through slot 149. In one embodiment, a force is manually applied in direction 153 to seed grain deposition linkage 130 (FIG. 12A) such as by sufficiently actuating knob-end shaft 128 of direction control linkage 126 toward second position 158. As a result, protruding member 127 (FIGS. 10B and 15) abuts seed grain deposition linkage 130, resulting in lever 138 rotating about pivot 140, and rotating end 144 such that flow control device 148 is actuated to no longer block slot 149, thereby permitting the flow of seed grain through slot 149. In other words, as shown in FIG. 12A, application of sufficient force in direction 153 to seed grain deposition linkage 130 actuates seed grain deposition linkage 130 from closed position 162 (FIG. 11A) toward a seed grain dispensing position 160, commencing the flow of seed grain through slot 149. As shown collectively in FIGS. 10B and 15, as a result of direction control linkage 126 being actuated to second position 158, a pin connection 164 between direction control linkage 126 and frame 108 results in frame 108 being urged in travel direction 155 (that is transverse to the direction of longitudinal travel of seed deposition device 42 relative to frame 12) toward stop 122 (FIG. 15). As a result of frame 108 being urged toward stop 122, corresponding ratcheting teeth 113 is of ratcheting pair 111 are brought into alignment to confront pins 86 of propulsion device 46 (FIGS. 20-21).

Prior to frame 108 being urged toward stop 122 such that ratcheting teeth 113 are brought into alignment to confront pins 86 of propulsion device 46, it should be confirmed that propulsion device(s) 46 associated with the growing level surface onto which seed grain is to be applied has been engaged to locking feature 104 (FIG. 3). After propulsion devices 46 have been confirmed to engage locking feature 104, oscillation device 50 of oscillating subframe 30 is actuated to commence oscillating movement as previously discussed. In one embodiment the order of a number of the steps discussed above can be reversed or performed simultaneously. Once oscillating movement of oscillating subframe 30 has commenced, seed deposition device 42 is sufficiently manually urged away from elevation control device 36 in a direction toward end 15 of frame 12 until ratcheting teeth 113 confront pins 86 of propulsion device 46, resulting in movement of seed deposition device 42 toward end 15 of frame 12 during oscillating strokes in which ratcheting teeth 113 are in the gripping direction. That is, movement of seed deposition device 42 occurs during an oscillation stroke in which pins 86 are traveling toward end 15 of frame 12 and engaging teeth of ratcheting teeth 113. Seed deposition device 42 does not move during the return oscillation stroke of propulsion device 46, other than from residual momentum generated during the previous driving oscillation stroke.

Figure 22:
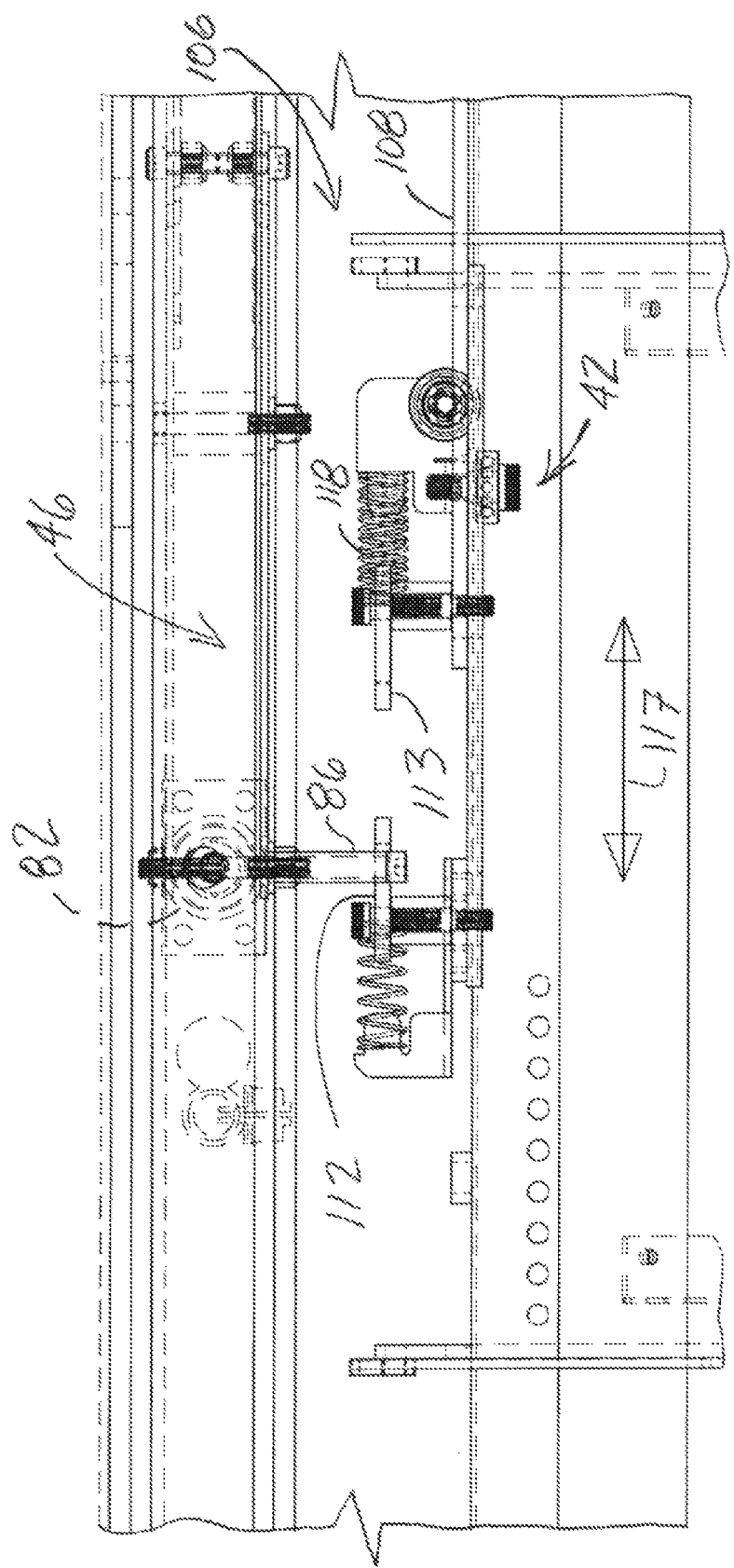
FIG. 22 illustrates an enlarged partial end view of a propulsion device drivingly moving a seed deposition device in a direction opposite that of FIG. 21 taken along region 21 of FIG. 20, according to an embodiment of the disclosure.

As seed deposition device 42 approaches end 15 of frame 12, seed grain deposition linkage 130 is brought into contact with a corresponding structural member (not shown) such as a stop. However, as a result of this contact, as collectively shown in FIGS. 10A and 14, force is applied in direction 152 to seed grain deposition linkage 130, actuating direction control linkage 126 from second position 158 (FIG. 15) to first position 156. Further, as direction control linkage 126 is actuated toward first position 156, pin connection 164 between frame 108 and direction control linkage 126 results in frame 108 being urged in travel direction 154 toward stop 120 of seed deposition device 42. As a result of frame 108 being urged toward stop 120, corresponding ratcheting teeth 112 of ratcheting pair 111 are brought into alignment to confront pins 86 of propulsion device 46 (FIGS. 20, 22).

Additionally, as a further result of seed grain deposition linkage 130 contacting the structural member (not shown) and being subjected to a force in direction 152 (FIG. 11A), rotational movement of lever 138 in a direction opposite that shown in FIG. 12A, such that end 144 of lever 138 urges flow control device 148 into a position covering slot 149 of container 109, i.e, flow control device 148 is moved to a closed position 162 (FIG. 11B).

Once frame 108 has been urged toward stop 120 and corresponding ratcheting teeth number 112 of ratcheting pair 111 are brought into alignment to confront pins 86 of propulsion device 46, oscillating movement of oscillating subframe 30 begins to propel seed deposition device 42 in an opposite direction. That is, ratcheting teeth 112 confront pins 86 of propulsion device 46, resulting in movement of seed deposition device 42 toward end 13 of frame 12 during oscillating strokes in which ratcheting teeth 112 are in the gripping direction. That is, movement of seed deposition device 42 occurs during an oscillation stroke in which pins 86 are traveling toward end 13 of frame 12 and engaging teeth of ratcheting teeth 112. Seed deposition device 42 does not move during the return oscillation stroke of propulsion device 46, other than from residual momentum generated during the previous driving oscillation stroke. Once seed deposition device 42 reaches elevation control device 36, ratcheting teeth 112 no longer engage pins 86. By incorporating a small downwardly directed or slanted receiving area in elevation control device 36, seed deposition device 42 continues to move into the receiving or docking portion associated with elevation control device 36 without further assistance.

As shown collectively in FIGS. 2 and 16, cleaning device 40 is positioned in elevation control device 36 adjacent to end 13 of frame 12 and aligned to remove debris, which includes, as this is but is not limited to seed grain and sprouted seed grain that is to be removed from surface 28 of seed grain growing level L5 after a continuous mass of sprouted seed grain has previously been removed or harvested from seed grain growing level L5 in a manner previously discussed. Cleaning device 40 includes a frame 166 having wheels 150 that configured to move over longitudinal support members 22 of frame 12 as previously discussed with seed deposition device 42. In addition, cleaning device 40 includes movable frame 108 having engagement features 106 such as a pair 111 of opposed ratcheting teeth 112, 113 and direction control linkages 126 as previously discussed with seed deposition device 42. Cleaning device 40 includes a power source 168, such as one or more batteries providing electrical power to a motor 170 and operates a drive belt 172 for rotatably driving a brush 174 about an axis 176 to remove the debris from surface 28. Optionally, cleaning device 40 includes a container 210 having a filler neck 212 for receiving and holding cleaning solution for release as cleaning device 40 moves over the surface to be cleaned, as well as an electrical docking connection (not shown) to prevent discharge of battery power.

As collectively shown in FIGS. 9 and 17-19, cutter 44 is now discussed. Cutter 44 includes a blade 178, such as a circular cutting blade that is urged into rotational movement about an axis 179 by a motor 180. Motor 180 is secured within a housing 182 having wheels 184 configured to collectively move housing 182, motor 180 and blade 178 along tracks 186 associated with table 181. Cutter 44 further includes a shuttle mechanism 188 having a motor 190 for operatively engaging a drive belt that is secured to housing 182 for providing selective movement 194 along table 181 between a home position 206 and an extended position 208. Table 181 is positioned and extends in a direction that is substantially transverse to the direction of movement of a mass 34 of seed grain being removed from a surface 28 of a seed grain growing layer L1, L2, L3, L4, L5, L6 (FIG. 2) by extraction device 38 (FIG. 3). To permit selective vertical alignment of cutter 44 with a corresponding seed grain growing layer L1, L2, L3, L4, L5, L6, an elevation control device 198, such as a manually operated drive 200, includes guide tracks 202 having bearings 204 for providing smooth rolling engagement with corresponding vertical members 196. That is, as a result of selective manipulation of elevation control device 198, cutter 44, which collectively includes blade 178, motor 180, housing 182, shuttle mechanism 188 and table 181, can be moved to a vertical position that is aligned with and configured to incrementally receive a mass 34 of seed grain that is being removed by extraction device 38.

Once cutter 44 has been aligned with a surface 28 supporting a mass 34 of sprouted seed grain from a corresponding seed grain growing layer L1, L2, L3, L4, L5, L6 (FIG. 2), extraction device 38 is actuated in opposed oscillating strokes by oscillation device 50, in which the oscillation stroke in a drive direction (moving from end 13 of frame 12 toward end 15 of frame 12) similarly moves, advances or drives mass 34 of sprouted seed grain relative to supporting surface 28 toward end 15 of frame 12. As a result, a portion of mass 34 of sprouted seed grain extends over and is supported by table 181. Upon completion of the oscillation stroke in the drive direction, motor 180 is activated, such as by a switch to urge blade 178 into rotational movement about axis 179. Substantially simultaneously, such as by a switch, motor 190 of shuttle mechanism 188 is activated, such that drive belt 192 urges housing 182, as well as motor 180 and blade 178, into movement 194 along table 181 from a home position 206 to an extended position 208, then returning to home position 206. Upon housing 182 returning to home position 206, motors 180, 190 are deactivated. During movement of housing 182 from home position 206 to extended position 208, blade 178 cuts the underside of mass 34 of sprouted seed grain along table 181. Blade 178 is sized and configured to cut through the tangled roots of sprouted seed grain, permitting a slice of mass 34 of sprouted seed grain substantially the width of the driving oscillating stroke to be formed. In one embodiment, motors 180, 190 may be actuated in response to more than one oscillation stroke (i.e., multiple oscillation strokes), resulting in a slice of mass 34 of sprouted seed grain having additional width, if desired. Activation of motors 180, 190 occurs during the return (non-driving) oscillating stroke, such that mass 34 of sprouted seed grain does not move relative to cutter 44. Upon completion of a subsequent driving oscillating stroke, the slice of mass 34 of sprouted seed grain is pushed off of table 181 by the leading edge of the remaining mass 34 of sprouted seed grain supported on the surface 28, the slice of mass 34 of seed grain falling onto conveyor 48 (FIG. 2). Motors 180, 190 are again actuated to form a subsequent slice of mass 34 of sprouted seed grain along table 181. The above process is repeated until mass 34 of sprouted seed grain has been sliced and removed from the corresponding surface 28 of a growing seed grain level. In one embodiment, cutter 44 is not utilized, in which the entire continuous mass 34 of seed grain can be loaded onto suitable equipment, such as a skid loader that can support the considerable collective weight of the continuous mass 34 of seed grain.

Upon removal of mass 34 of sprouted seed grain from a surface 28, cleaning device 40 is utilized to remove debris from surface 28, followed by seed deposition device 42 applying a seed layer onto the recently cleaned surface 28. In one embodiment, a continuous harvesting cycle can be established, in which seed deposition device 42 applies a seed layer onto a different seed grain growing level each day. If six seed grain growing levels are utilized, and assuming a growth cycle of six days to grow a mass 34 of seed grain that is ready for harvesting, on day 7, the first mass 34 of seed grain is harvested, the seed grain growing surface cleaned and seed grain re-applied onto the surface. At this point a continuous cycle can be employed, utilizing a first in, first out technique for permitting a systematic, predictable method for harvesting sprouted seed grain. Other growing/harvesting cycles can be employed.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for growing and harvesting a tangled mass composed of sprouted seed grain, comprising:
    a plurality of overlying immobile (relative to the frame), substantially planar surfaces having a length, each surface configured to receive a layer of seed grain that is permitted to grow for a predetermined period of time on each surface, the layer of seed grain becoming a continuous tangled mass of sprouted seed grain; and
    an extraction device for removing the mass from each surface;
    wherein the apparatus has an oscillating subframe for selectively moving the extraction device over each surface of the plurality of surfaces between a stored first position and an extended second position;
    wherein the subframe includes a plurality of substantially aligned pivoting fingers configured to extend in response to oscillating movement of the subframe in one direction for moving the mass relative to the corresponding surface, the plurality of pivoting fingers configured to retract in response to oscillating movement of the subframe in an opposite direction.

2. The apparatus of claim 1, wherein the apparatus further comprises a seed deposition device for depositing the layer of seed grain onto each surface in response to oscillating movement of the subframe.

3. The apparatus of claim 2, wherein the subframe comprises a plurality of substantially aligned protruding elements angularly offset from the plurality of pivoting fingers for confronting engagement features for selectively moving the seed deposition device along the surface between a stored first position and an extended second position.

4. The apparatus of claim 3, wherein the engagement features comprise a pair of oppositely oriented ratcheting teeth each having a gripping direction and a sliding direction.

5. The apparatus of claim 4, wherein the pair of ratcheting teeth are secured by biasing elements for permitting movement of the pair of ratcheting teeth transverse to a direction of movement of the seed deposition device in response to oscillating movement of the plurality of protruding elements confronting ratcheting teeth in the sliding direction.

6. The apparatus of claim 2, wherein the apparatus further comprises a first elevation control device for providing selective vertical alignment of the seed deposition device with each surface.

7. The apparatus of claim 6, wherein the first elevation control device includes a frame configured to support the seed deposition device.

8. The apparatus of claim 6, wherein the first elevation control device includes a biasing member to reduce a force required to lift the seed deposition device.

9. The apparatus of claim 2, wherein the seed deposition device is configured to deposit a layer of seed grain when moving between the first position and the second position.

10. The apparatus of claim 1, wherein the apparatus further comprises a cutter configured to cut a strip from the mass after the mass is advanced relative to the surface.

11. The apparatus of claim 10, wherein a width of the strip substantially corresponds to an oscillation stroke length.

12. The apparatus of claim 10, wherein movement of the cutter transverse to oscillating movement of the subframe occurs while the direction of oscillating movement is opposite the direction of movement of the mass relative to the surface.

13. The apparatus of claim 10, wherein the cutter is configured to cut an underside of the mass.

14. The apparatus of claim 10, wherein the apparatus further comprises a second elevation control device for providing selective vertical alignment of the cutter with each surface.

15. The apparatus of claim 10, wherein the apparatus further comprises a conveyor configured to receive strips cut from the mass.

16. The apparatus of claim 1, wherein the apparatus further comprises a cleaning device for removing debris from each surface prior to each surface receiving a subsequent layer of seed grain.

17. The apparatus of claim 16, wherein the oscillating subframe selectively moves the cleaning device over each surface of the plurality of surfaces between a stored first position and an extended second position.

18. The apparatus of claim 17, wherein the subframe comprises a plurality of substantially aligned protruding elements angularly offset from the plurality of pivoting fingers for confronting engagement features for selectively moving the cleaning device along the surface between a stored first position and an extended second position.

19. An apparatus for growing and harvesting a mass composed of sprouted seed grain, comprising:
    a plurality of overlying immobile (relative to the frame), substantially planar surfaces having a length, each surface configured to receive a layer of seed grain that is permitted to grow for a predetermined period of time on each surface, the layer of seed grain becoming a continuous tangled mass of sprouted seed grain;
    a seed deposition device for depositing the layer of seed grain onto each surface;
    an extraction device for removing the mass from each surface;
    an oscillating subframe for selectively moving each of the seed deposition device and the extraction device, and the cleaning device over each surface of the plurality of surfaces between a stored first position and an extended second position;
    wherein the subframe includes a plurality of substantially aligned pivoting fingers configured to extend in response to oscillating movement of the subframe in one direction for moving the mass relative to the corresponding surface, the plurality of pivoting fingers configured to retract in response to oscillating movement of the subframe in an opposite direction.

20. A method for growing and harvesting a mass composed of sprouted seed grain, comprising:
   providing a device as claimed in claim 1;
   actuating the oscillating subframe;
   aligning the seed deposition device with a corresponding surface devoid of a seed grain layer;
   engaging the seed deposition device with the oscillating subframe;
   engaging the extraction device with a corresponding surface containing a continuous mass of sprouted seed grain for removing the mass from the surface.

* * * * *